United States Patent
Akahane et al.

(10) Patent No.: US 7,795,930 B2
(45) Date of Patent: Sep. 14, 2010

(54) DRIVE CONTROL APPARATUS FOR CONTROLLING DRIVE OF INDUCTIVE LOAD AND DRIVE CONTROL METHOD FOR CONTROLLING THE SAME

(75) Inventors: Masashi Akahane, Matsumoto (JP);
Motomitsu Iwamoto, Matsumoto (JP);
Haruhiko Nishio, Matsumoto (JP);
Minoru Nishio, Matsumoto (JP);
Hiroshi Tobisaka, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 75 days.

(21) Appl. No.: 12/320,162

(22) Filed: Jan. 21, 2009

(65) Prior Publication Data
US 2009/0189580 A1 Jul. 30, 2009

(30) Foreign Application Priority Data
Jan. 24, 2008 (JP) .............................. 2008-013857

(51) Int. Cl.
*H03K 3/00* (2006.01)
(52) U.S. Cl. .................... 327/110; 327/423; 327/588
(58) Field of Classification Search ............. 327/110, 327/423, 588
See application file for complete search history.

(56) References Cited

U.S. PATENT DOCUMENTS 6,256,163 B1 * 7/2001 Schmidt et al. .......... 360/78.09
6,943,514 B1 * 9/2005 Chen et al. ............. 318/400.29

FOREIGN PATENT DOCUMENTS

| JP | H08-277956 A | 10/1996 |
| JP | H11-159652 A | 6/1999 |
| JP | 2007-40361 A | 2/2007 |

* cited by examiner

*Primary Examiner*—Kenneth B. Wells
(74) *Attorney, Agent, or Firm*—Manabu Kanesaka

(57) ABSTRACT

A drive control apparatus controls a drive of an inductive load having a current flowing therethrough. The drive control apparatus includes a drive control device for controlling a variation of the current flowing through the inductive load within a certain period by Pulse Width Modulation control so as to come close to a reference current value, and a reference value control device for controlling a fluctuation period of the reference current value and making the fluctuation period of the reference current value longer than that of the current flowing through the inductive load by the Pulse Width Modulation control.

8 Claims, 15 Drawing Sheets

```
PERIOD=2ms
FREQUENCY=500Hz
```

```
IRIPPLE=50mA
```

DRIVE CONTROL APPARATUS FOR CONTROLLING DRIVE OF INDUCTIVE LOAD AND DRIVE CONTROL METHOD FOR CONTROLLING THE SAME

BACKGROUND OF THE INVENTION AND RELATED ART STATEMENT

The present invention relates to a drive control apparatus and a drive control method for controlling the drive of an inductive load. Specifically, the invention relates to a driver control apparatus and a drive control method, which are applied preferably for controlling the drive of an inductive load such as a solenoid actuator used in automatic transmissions for automobiles. Hereinafter, the drive control apparatus for controlling the drive of an inductive load will be referred to simply as the "drive control apparatus". Also, the drive control method for controlling the drive of an inductive load will be referred to simply as the "drive control method".

In driving an inductive load such as the solenoid actuator used in automatic transmissions for automobiles, the current flowing through the inductive load is controlled by pulse width modulation (hereinafter referred to as "PWM").

FIG. 21 is a block diagram briefly describing a closed loop control system, to which a conventional drive control apparatus is applied.

In FIG. 21, driver circuit 13 that drives inductive load 15 is connected to a first end of inductive load 15 such as a linear solenoid. Current detecting resistor 17 is connected in series to a second end of inductive load 15. Drive control circuit 102 that conducts PWM control by analog data processing is disposed in a front stage of driver circuit 13. D/A converter 101 is disposed in a front stage of drive control circuit 102.

Average current detecting circuit 14 that detects an average value of the current flowing through inductive load 15 is connected between the first and second ends of current detecting resistor 17. An output from average current detecting circuit 14 is connected to drive control circuit 102.

A current value control data FC that indicates the reference value of the current flowing through inductive load 15 is converted to an analog data in D/A converter 101. Then, the converted analog data is fed to drive control circuit 102. Current If that flows through inductance L of inductive load 15 flows through current detecting resistor 17. The average value $I_{AVR}$ of current If flowing through inductive load 15 is detected by the average current detecting circuit 14 and fed to drive control circuit 102. (Hereinafter, current If flowing through inductive load 15 will be referred to simply as "current If")

Drive control circuit 102 generates a PWM signal, which makes the average value $I_{AVR}$ of current If coincide with the reference value indicated by the current value control data FC, to control the ON and OFF of a switching device in driver circuit 13, thereby further conducting the PWM control over current If.

FIG. 22 is a block diagram briefly describing another closed loop control system, to which a conventional drive control apparatus is applied.

In FIG. 22, driver circuit 13 that drives inductive load 15 is connected to the first end of inductive load 15 and current detecting resistor 17 is connected in series to the second end of inductive load 15. Drive control circuit 112 that conducts PWM control by digital data processing is disposed in the front stage of driver circuit 13.

Average current detecting circuit 114 is connected between the first and second ends of current detecting resistor 17. The output from average current detecting circuit 114 is connected to drive control circuit 112 via A/D converter 111.

The current value control data FC, which indicates the reference value of the current flowing through inductive load 15, is fed to drive control circuit 112. Current If that flows through inductance L of inductive load 15 flows through current detecting resistor 17. The average value $I_{AVR}$ of current If is detected by average current detecting circuit 114. The average value $I_{AVR}$ is converted to a digital data by A/D converter 111 and fed to drive control circuit 112.

Drive control circuit 112 generates a PWM signal that makes the average value $I_{AVR}$ of current If coincide with the reference value indicated by the current value control data FC to control the ON and OFF of a switching device in driver circuit 13, thereby further conducting the PWM control of current If.

FIG. 23 is a timing chart describing the waveform of current If that is made to flow through inductive load 15 by the PWM control conducted by the conventional drive control apparatus.

As described in FIG. 23, current If is controlled to increase when a PWM signal level is high and to decrease when the PWM signal level is low so that the average value $I_{AVR}$ of current If may coincide with the reference value indicated by the current value control data FC.

The states of the PWM signal (on the high level or on the low level) are determined by the functions of a switching device used in driver circuit 13. In the example described above with reference to FIG. 23, it is assumed that the switching device shifts to the OFF-state thereof when the PWM signal level is low.

By controlling the ON and OFF of the switching device in driver circuit 13, a current ripple, the maximum value of which is a peak current $I_H$ and the minimum value of which is a bottom current $I_L$, is caused on current If. The period T of the PWM signal for controlling an automatic transmission for automobiles is set so that the plunger of a linear solenoid is provided with micro-vibrations and the sliding resistance of the linear solenoid may be minimized.

A current ripple amount $(I_H-I_L)$ is set within the specifications of the detectable current range of average current detecting circuit 14 so as not to cause any error in the average current value $I_{AVR}$ detected by average current detecting circuit 14.

In controlling currents If flowing through inductive loads 15 and exhibiting different characteristics, current If flowing through any of inductive loads 15 may be sometimes outside the detectable current range of average current detecting circuit 14, since the peak current $I_H$ and the bottom current $I_L$ change.

FIG. 24 is a timing chart describing the waveforms of currents If flowing through inductive loads 15 exhibiting different characteristics, during the PWM control conducted by the conventional drive control apparatus.

As inductance L of inductive load 15 becomes small in FIG. 24, the current ripple amount $(I_H-I_L)$ of current If flowing through inductive load 15 increases. If the detectable current range of average current detecting circuit 14 is set corresponding to the normal current ripple amount $(I_H-I_L)$ of current If, the current ripple amount $(I_H-I_L)$ of current If will be outside the detectable current range of average current detecting circuit 14.

For controlling currents If flowing through inductive loads 15 exhibiting different characteristics, average current detecting circuits 14 having the respective detectable current ranges are prepared according to the characteristics of inductive loads 15. Alternatively, average current detecting circuit 14 having a detectable current range corresponding to a possible peak current $I_H$ and a possible bottom current $I_L$ is prepared.

Patent Document 1 (Japanese Unexamined Patent Application Publication No. 2007-40361, Counterpart: WO 2007015485) discloses a method for obtaining dither frequencies for various voltages applied to a solenoid valve from a map by using the driving currents of the solenoid valve as parameters. The method disclosed in the Patent Document 1 facilitates reductions of the hysteresis motion of the solenoid valve and the abrasion of a movable part.

Patent Document 2 (Japanese Unexamined Patent Application Publication No. 11-159652) discloses a method for changing a control target (reference value) and a dither frequency preset in a pulse width modulation circuit to automatically change the dither frequency in addition to the control target for a solenoid proportional control valve. The method disclosed in the Patent Document 2 realizes the variable dither frequency and the control of the solenoid proportional control valve with low costs.

FIG. 25 is a timing chart describing the waveform of current If flowing through inductive load 15 and controlled by a PWM signal with a dither signal from the conventional drive control apparatus.

In FIG. 25, a dither signal having the frequency higher than the frequency of a PWM signal is superposed onto the PWM signal. Here, the period of the dither signal is represented by $\Delta t$. By the superposition, the ON-period and OFF-period of the PWM signal are subdivided into short periods. Further, by setting an ON/OFF time ration R in the subdivided short periods, the peak current $I_H$ and the bottom current $I_L$ are adjusted. In detail, even in the ON-period of the PWM signal, current If decreases for the time period $\Delta t \cdot (1-R)$, for which the switching device is OFF, in the subdivided short period $\Delta t$. Even in the OFF period of the PWM signal, current If increases for the time period $\Delta t (1-R)$, for which the switching device is ON, in the subdivided short period $\Delta t$. Therefore, the differences caused in the ripple amount $(I_H-I_L)$ of current If can be negated by changing the ratio R of the dither signal corresponding to the differences of the characteristics of inductive loads 15. Even when the characteristics of inductive loads 15 are different, the current ripple amounts $(I_H-I_L)$ can be controlled within the detectable current range of average current detecting circuit 14. When the time ratio R is set at 1, the current ripple amount $(I_H-I_L)$ shows the maximum.

In preparing average current detecting circuits 14 wherein the respective detectable current ranges thereof are different from each other, considering the characteristics of inductive loads 15, a specific circuit design will be necessary for every inductive load 15 and the man-hours necessary for designing and the costs necessary for development will increase.

If preparing average current detecting circuit 14 having a detectable current range corresponding to possible ranges of the peak current $I_H$ and bottom current $I_L$, the specifications for the detectable current range of average current detecting circuit 14 will be determined uniformly. Therefore, inductive load 15 outside the specifications will be unusable. Moreover, if inductive load 15, wherein the current ripple amount $(I_H-I_L)$ thereof is small, is used, only a small part of the detectable current range of average current detecting circuit 14 will be used, leaving a large part of the circuit useless.

For controlling the current ripple amount $(I_H-I_L)$ within the detectable current range of average current detecting circuit 14 by the method for adding a dither signal to a PWM signal, it is necessary to change the dither signal time ratio R corresponding to the differences in characteristics of inductive loads 15. Therefore, it is necessary to prepare an IC for every inductive load 15, thereby increasing the manufacturing costs.

In view of the foregoing, it would be desirable to obviate the problems described above. It would be also desirable to provide a drive control apparatus for controlling the drive of an inductive load on the same circuit to reduce the sliding resistance of a linear solenoid and change the current ripple amount such that the changed current ripple amount is suited for the detectable range of the current flowing through the inductive load. It would be further desirable to provide a drive control method for controlling the drive of an inductive load on a same circuit to reduce the sliding resistance of a linear solenoid and change the current ripple amount such that the changed current ripple amount is suited for the detectable range of the current flowing through the inductive load.

Further objects and advantages of the invention will be apparent from the following description of the invention.

SUMMARY OF THE INVENTION

According to a first aspect of the invention, there is provided a drive control apparatus for obviating the problems described above and for controlling the drive of an inductive load, the drive control apparatus including:

a drive control means for making the variation of a current flowing through the inductive load caused within a certain period by a PWM control come close to a reference current value; and a reference value control means for controlling the fluctuation period of the reference current value to make the fluctuation period of the reference current value to be longer than the fluctuation period of the current flowing through the inductive load due to the PWM control.

According to a second aspect of the invention, the drive control means sets the pulse width due to the PWM control based on the difference between the average value of the current flowing through the inductive load and the reference current value.

According to a third aspect of the invention, the inductive load is a linear solenoid, and the fluctuation period of the reference current value is set such that the sliding resistance of the linear solenoid is minimized. Also, the fluctuation period due to the PWM control is set such that the current ripple amount of the current flowing through the inductive load falls within a detectable current range.

According to a forth aspect of the invention, the drive control apparatus further includes an amplitude setting means for setting the amplitude of the reference current value.

According to a fifth aspect of the invention, the drive control apparatus further includes a period setting means for setting the period of the reference current value.

According to a sixth aspect of the invention, the drive control apparatus further includes a waveform setting means for setting the waveform of the reference current value.

According to a seventh aspect of the invention, the drive control apparatus further includes an average current detecting means for detecting the average value of the current flowing through the inductive load by digital processing, wherein the average current detecting means includes an A/D converter used therein, the A/D converter having a bit number set corresponding to an amplitude of the reference current value.

According to an eighth aspect of the invention, there is provided a drive control method for controlling the drive of an inductive load, the drive control method including the steps of:

making the variation of a current flowing through the inductive load caused within a certain period by a PWM control come close to a reference current value; and controlling the fluctuation period of the reference current value to make the fluctuation period of the reference current value longer than a fluctuation period of the current flowing through the inductive load due to the PWM control.

As described above, the fluctuation period of the reference current value is controlled such that the fluctuation period of the reference current value is set to be longer than the fluctuation period of the current flowing through the inductive load caused by the PWM control. The control described above makes it possible to provide the reference current value with a current ripple amount for minimizing the sliding resistance of a linear solenoid. Therefore, the fluctuation period of the current flowing through the inductive load due to the PWM control is shortened. Even when the characteristics of the inductive loads are different, it is possible to reduce the increment and decrement of the current ripple amount affected by the characteristics of the inductive load. Therefore, it is possible to reduce the sliding resistance of the linear solenoid and to change the current ripple amount on a same circuit so that the current ripple amount may fall within the detectable range of the current flowing through the inductive load.

DETAILED DESCRIPTION OF PREFERRED EMBODIMENTS

Now the invention will be described in detail hereinafter with reference to the accompanied drawings which illustrate the preferred embodiments of the invention.

Figure 1:
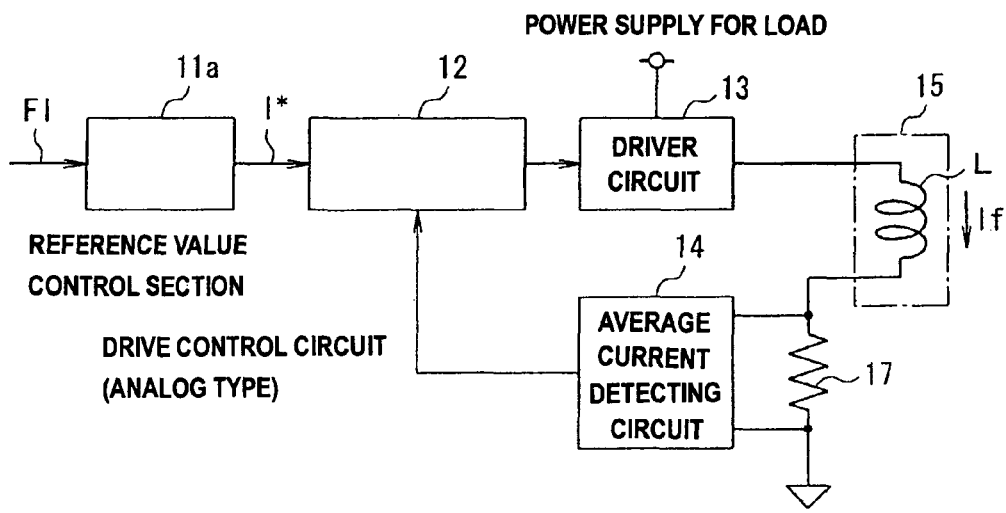
FIG. 1 is a block diagram briefly describing a closed loop control system, to which a drive control apparatus according to a first embodiment of the invention for controlling the drive of an inductive load is applied.

FIG. 1 is a block diagram briefly describing a closed loop control system, to which a drive control apparatus according to a first embodiment of the invention for controlling the drive of an inductive load is applied.

In FIG. 1, driver circuit 13 is connected to the first end of inductive load 15. Current detecting resistor 17 is connected in series to the second end of inductive load 15. Drive control circuit 12 that conducts a PWM control by analog data processing is disposed in the front stage of driver circuit 13. Reference value control section 11a is disposed in the front stage of drive control circuit 12.

Average current detecting circuit 14 is connected between the first and second ends of current detecting resistor 17. The output from average current detecting circuit 14 is connected to drive control circuit 12.

For controlling the drive of inductive load 15, drive control circuit 12 changes current If flowing through inductive load 15 by the PWM control so that current If flowing through inductive load 15 may come close to (follow) a reference current value I*. (Hereinafter, current If flowing through inductive load 15 will be referred to simply as "current If".) For example, drive control circuit 12 sets the pulse width due to the PWM control based on the difference between the average value $I_{AVR}$ of current If and the reference current value I*.

Reference value control section 11a controls the fluctuation period T2 of the reference current value I* so that the fluctuation period T2 may be longer than the fluctuation period T1 due to the PWM control of current If. For example, the fluctuation period T2 of the reference current value I* is set so that the sliding resistance of a linear solenoid as inductive load 15 may be minimized. The fluctuation period T1 due to the PWM control is set so that the ripple amount of current If may fall within the detectable current range detectable by average current detecting circuit 14. Since the variations of current If due to the PWM control becomes smaller as the fluctuation period T1 due to the PWM control becomes shorter, the peak current $I_H$ and the bottom current $I_L$ of current If can be controlled within the detectable current range by shortening the period T1, even when the amplitude of the reference current value I* is large to some extent.

A set current value data FI that specifies the average current value $I_{AVR}$ of current If is fed to reference value control section 11a. Reference value control section 11a generates a reference current value I*, the fluctuation period T2 thereof is longer than the fluctuation period T1 due to the PWM control and the average value $I_{AVR}$ thereof is specified by the set current value data FI. Reference value control section 11a feeds the generated reference current value I* to drive control circuit 12.

Current If flowing through inductance L of inductive load 15 flows through current detecting resistor 17. The average value $I_{AVR}$ of current If is detected by average current detecting circuit 14 and the detected average value $I_{AVR}$ is fed to drive control circuit 12.

Drive control circuit 12 generates a PWM signal so that current If may follow the reference current value I* and controls the ON and OFF of a switching device in driver circuit 13 to conduct the PWM control of current If.

The scheme described above makes it possible to control the fluctuation period T2 of the reference current value I* longer than the fluctuation period T1 due to the PWM control of current If. Therefore, it is possible to obtain a current ripple frequency for minimizing the sliding resistance of a linear solenoid through the reference current value I*. Therefore, it becomes possible to shorten the fluctuation period T1 caused in current If by the PWM control. Even when the characteristics of inductive loads 15 are different, it is possible to suppress the increase and decrease of the current ripple amount affected by the characteristics of inductive load 15. Therefore, it becomes possible, on a same circuit, to reduce the sliding resistance of the linear solenoid and to change the current ripple so that the current ripple may fall within the detectable current range of current If.

Figure 2:
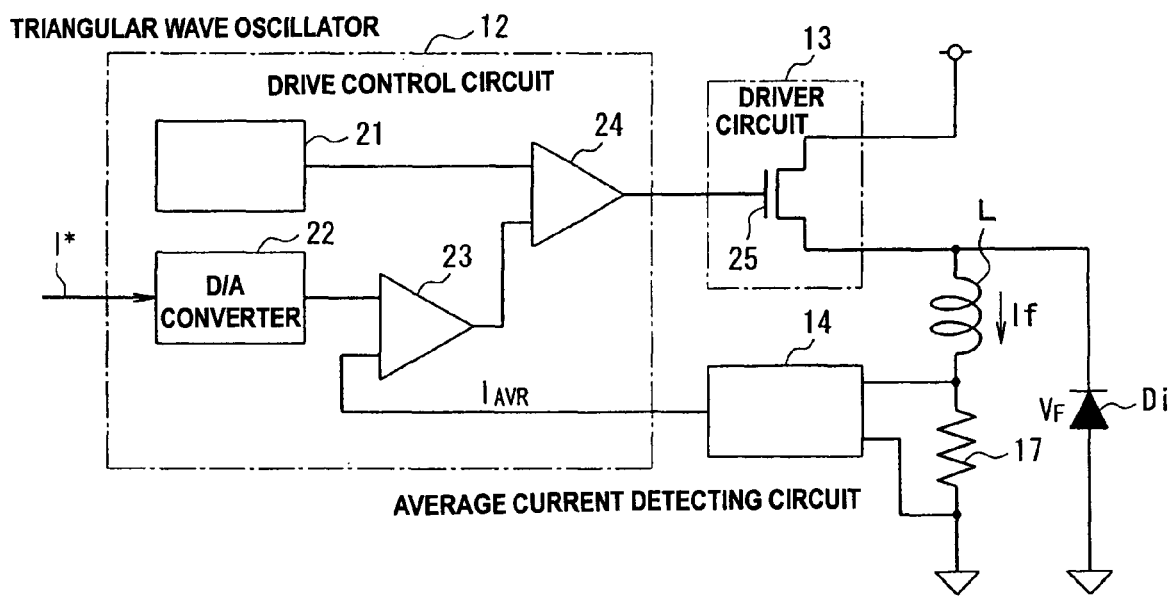
FIG. 2 is a block diagram briefly describing the structure of drive control circuit 12 shown in FIG. 1.

FIG. 2 is a block diagram briefly describing the structure of drive control circuit 12 shown in FIG. 1.

In FIG. 2, drive control circuit 12 includes triangular wave oscillator 21, D/A converter 22, operational amplifier 23, and comparator 24. Field effect transistor 25 is disposed in driver circuit 13.

The output terminal of D/A converter 22 is connected to the first input terminal of operational amplifier 23. The output terminal of average current detecting circuit 14 is connected to the second input terminal of operational amplifier 23. The output terminal of triangular wave oscillator 21 is connected to the first input terminal of comparator 24. The output terminal of operational amplifier 23 is connected to the second input terminal of comparator 24. The output terminal of comparator 24 is connected to the gate of field effect transistor 25.

Inductance L of inductive load 15 is connected in series to field effect transistor 25. The cathode of diode Di is connected to the connection point of field effect transistor 25 and inductance L.

The reference current value I* generated in reference value control section 11a is converted to an analog data in D/A converter 22. Then, the converted analog data is fed to operational amplifier 23. The average value $I_{AVR}$, detected by average current detecting circuit 14, of current If flowing through inductance L of inductive load 15 is fed to operational amplifier 23. Operational amplifier 23 detects the difference between the reference current value I* and the average value $I_{AVR}$ of current If and feeds the detected difference to comparator 24. A triangular wave generated in triangular wave oscillator 21 is fed to comparator 24. Comparator 24 compares the difference between the reference current value I* and the average value $I_{AVR}$ of current If with the triangular wave generated by triangular wave oscillator 21.

When the difference between the reference current value I* and the average value $I_{AVR}$ of current If is higher than the level of the triangular wave generated by triangular wave oscillator 21, comparator 24 feeds an OFF-signal to the gate of field effect transistor 25. When the difference between the reference current value I* and the average value $I_{AVR}$ of current If is lower than the level of the triangular wave generated by triangular wave oscillator 21, comparator 24 feeds an ON-signal to the gate of field effect transistor 25.

As the ON-signal is fed to the gate of field effect transistor 25, field effect transistor 25 is made to be ON, increasing current If flowing through inductance L. As the OFF-signal is fed to the gate of field effect transistor 25, field effect transistor 25 is made to be OFF, decreasing current If flowing through inductance L. Thus, current If flowing through inductive load 15 is controlled by the PWM control method so that current If may follow the reference current value I*. Diode Di is a commutation diode for providing current If with a path when field effect transistor 25 is made to be OFF.

Figure 3:
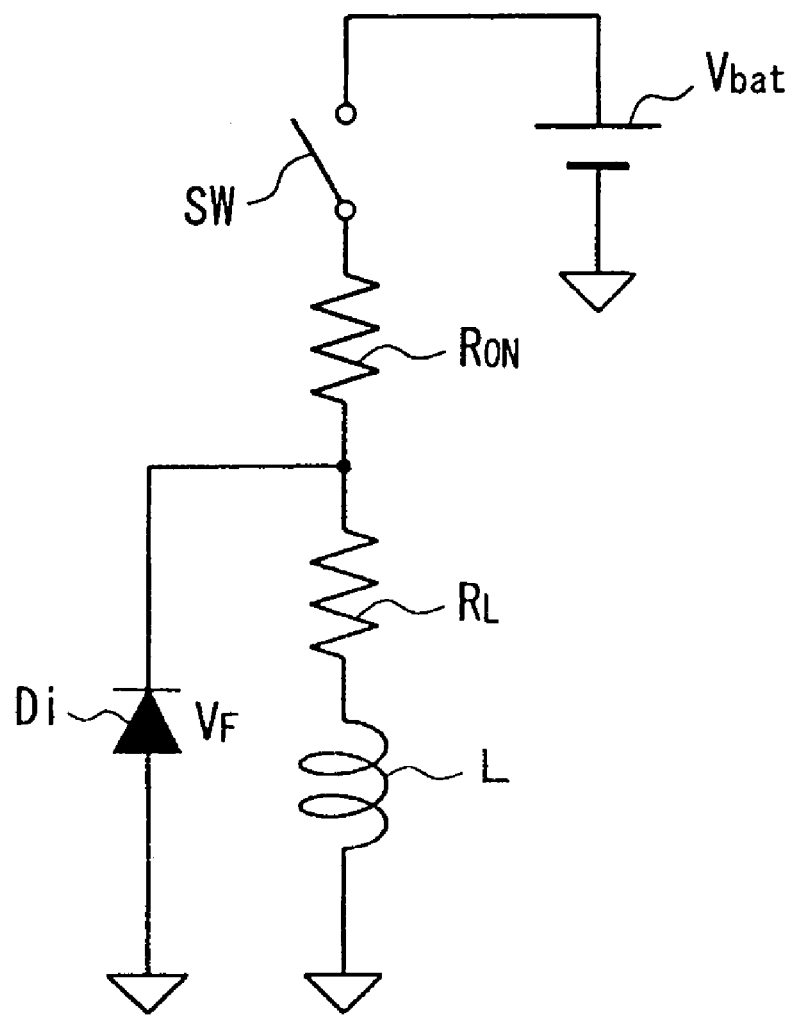
FIG. 3 is an equivalent circuit diagram briefly describing the structure of the closed loop control system shown in FIG. 1.

FIG. 3 is an equivalent circuit diagram briefly describing the structure of the closed loop control system shown in FIG. 1.

In FIG. 3, field effect transistor 25 is represented by switching device SW and ON-state resistance $R_{ON}$ equivalently. Inductive load 15 is represented by inductance L and solenoid resistance $R_L$ equivalently.

In FIG. 3, power supply Vbat, switching device SW, ON-state resistance $R_{ON}$, solenoid resistance $R_L$, and inductance L are connected in series one after another in the order of the above description.

Figure 4:
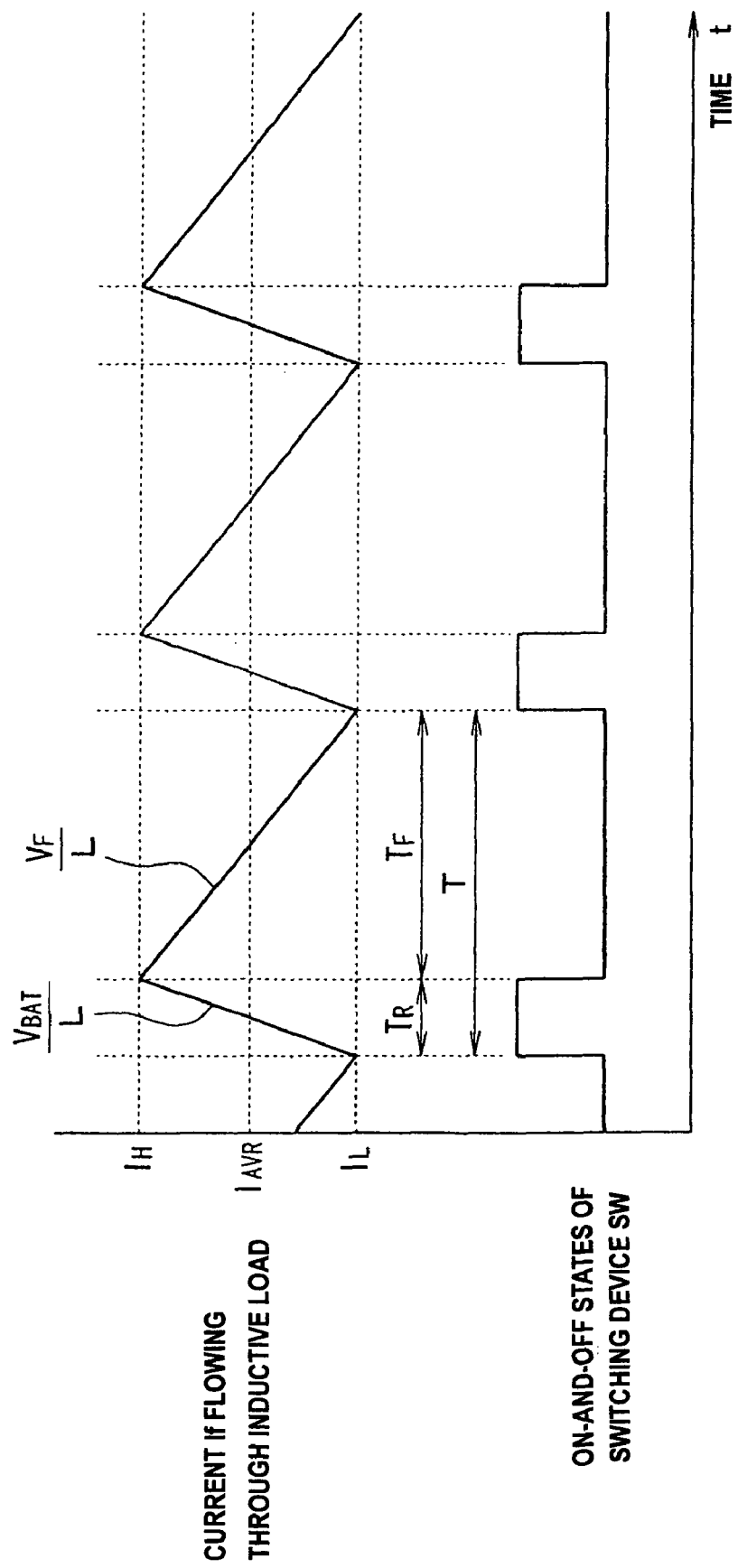
FIG. 4 is a timing chart describing the ON- and OFF-states of switching device SW in FIG. 3 and the waveform of current If flowing through inductive load 15 when the switching period of switching device SW is set so that the sliding resistance of a linear solenoid may be minimized.

FIG. 4 is a timing chart describing the ON- and OFF-states of switching device SW in FIG. 3 and the waveform of current If flowing through inductive load 15 when the switching period of switching device SW is set so that the sliding resistance of the linear solenoid may be minimized.

In FIG. 4, current If flowing through inductance L in FIG. 3 increases when the PWM signal level is high and decreases when the PWM signal level is low.

If one assumes for the sake of simplicity that ON-state resistance $R_{ON}$ and solenoid resistance $R_L$ do not exist and that the voltage of power supply Vbat is $V_{BAT}$, the following equations (1) through (3) will be obtained between the peak current $I_H$, the bottom current $I_L$ and the average value $I_{AVR}$ of current If.

$$I_H - I_L = V_{BAT}/L \cdot T_R = V_F/L \cdot T_F \quad (1)$$

$$T = T_R + T_F \quad (2)$$

$$I_{AVR} = (I_H + I_L)/2 \quad (3)$$

Here, $V_F$ is the forward voltage of diode Di. By solving the equations (1) through (3), the following equations (4) through (6) are obtained.

$$I_H = I_{AVR} + V_{BA} \cdot V_F \cdot T/(2L \cdot (V_{BAT} + V_F)) \quad (4)$$

$$I_L = I_{AVR} - V_{BA} \cdot V_F \cdot T/(2L \cdot (V_{BAT} + V_F)) \quad (5)$$

$$T_R = V_F \cdot T/(V_{BAT} + V_F) \quad (6)$$

As the equations (4) and (5) indicate, the current ripple amount $(I_H - I_L)$ is inversely proportional to the value of inductance L and proportional to the period T. Therefore, the current ripple amount $(I_H - I_L)$ due to the PWM control can be made to be small by increasing the PWM signal frequency, thereby shortening the period T1 as shown in FIG. 5.

Figure 5:
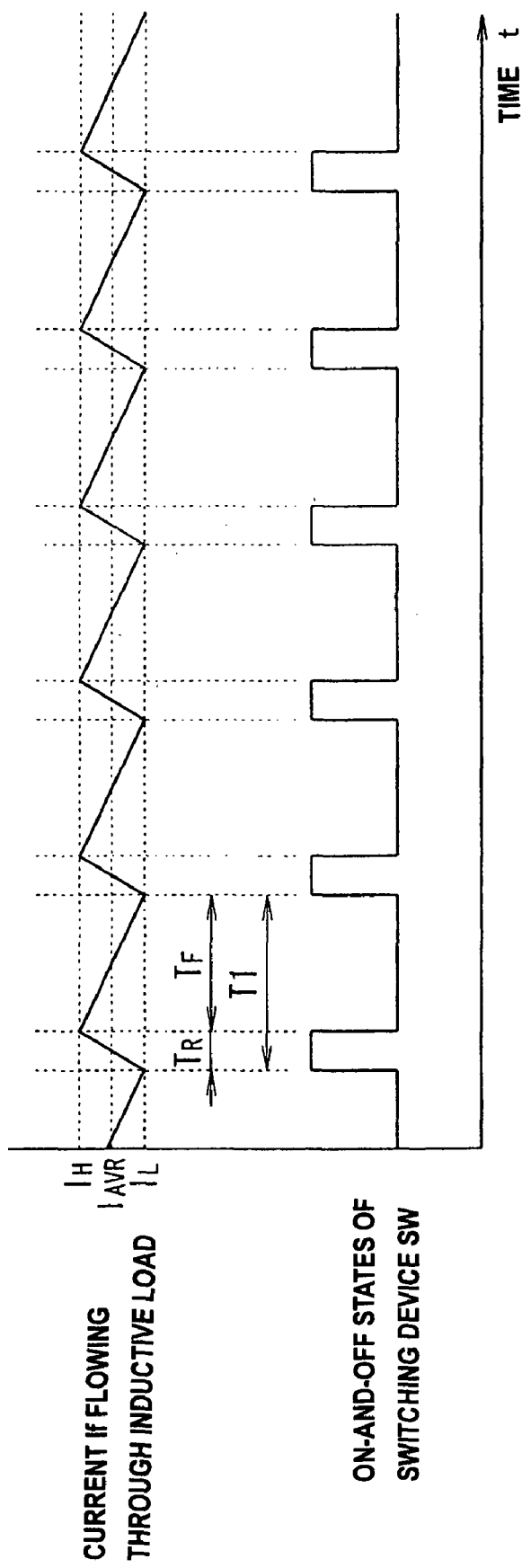
FIG. 5 is a timing chart describing the ON- and OFF-states of switching device SW in the equivalent circuit shown FIG. 3 and the waveform of current If flowing through inductive load 15 when the switching period thereof is shortened.

The average value $I_{AVR}$ is fixed in FIG. 5. Even if the average value $I_{AVR}$ is changed and the characteristics of inductive loads 15 are different, the current ripple amount $(I_H - I_L)$ containing the change of the average value $I_{AVR}$ and the variations due to the PWM control will be confined within the detectable current range of average current detecting circuit 14 by shortening the period T1.

Figure 6:
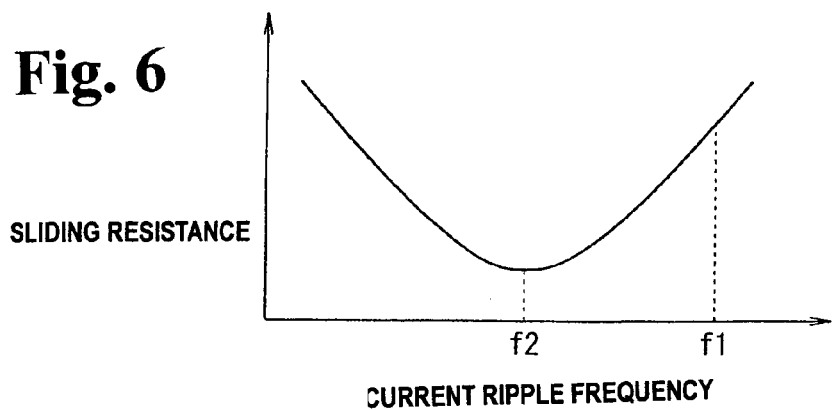
FIG. 6 is a curve relating to the current ripple frequency and the sliding resistance of a linear solenoid with each other.

If the period T1 of the PWM signal is shortened in the state described in FIG. 5 and the PWM signal frequency is set at f1 described in FIG. 6, the sliding resistance of the linear solenoid will increase, since the frequency f1 is far from the frequency f2, at which the sliding resistance of the linear solenoid is minimized.

For obviating the problem described above, the fluctuation period T2 of the reference current value I* fed to drive control circuit 12 is set to be longer than the fluctuation period T1 of the PWM signal and the frequency of the reference current value I* is set at f1. By the settings described above, the sliding resistance of the linear solenoid can be minimized, even when the period T1 of the PWM signal is shortened. Thus, the sliding resistance of the linear solenoid is reduced and the current ripple amount is changed on the same circuit so that the current ripple amount may fall within the detectable range of current If.

Figure 7:
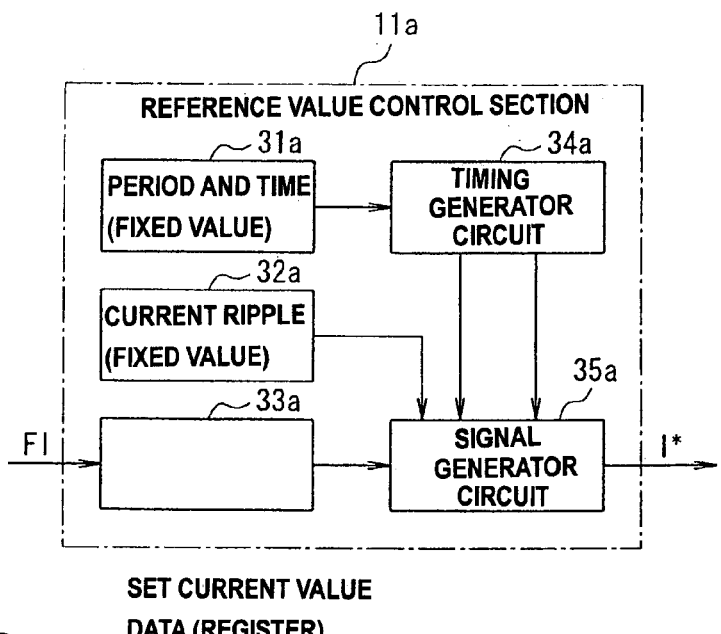
FIG. 7 is a block diagram briefly describing the structure of reference value control section 11a shown in FIG. 1.

FIG. 7 is a block diagram briefly describing the structure of reference value control section 11a shown in FIG. 1.

In FIG. 7, reference value control section 11a includes period and time data storage section 31a, current ripple data storage section 32a, set current data storage section 33a, timing generator circuit 34a, and signal generator circuit 35a.

Period and time data storage section 31a stores any or both of the period data and the time data of the reference current value I* as fixed values. The period data is used for the sinusoidal wave of the reference current value I* and the time data for the non-sinusoidal wave of the reference current value I*.

Current ripple data storage section 32a stores the current ripple data of the reference current value I* as a fixed value. In reference value control section 11a described with reference to FIG. 7, the current ripple data is not always limited to $(I_H - I_L)$. The current ripple data is not always limited to $(I_H - I_L)$ also in reference value control section 11b according to a second embodiment described later with reference to FIG. 14, reference value control section 11c according to a third embodiment described later with reference to FIG. 15 and reference value control section 11d according to a fourth embodiment described later with reference to FIG. 16. The current ripple data may be the peak current $I_H$ and the bottom current $I_L$. The current ripple data may be $I_{RIPPLE}$ described later. Here, the peak current $I_H$ and the bottom current $I_L$ are the values obtained by lowering and raising the upper limit and the lower limit of the detectable current range, respectively, for the variation width of current If due to the PWM control.

Set current data storage section 33a stores the set current value data FI as a variable. Timing generator circuit 34a generates the generation timing for generating the reference current value I*. Signal generator circuit 35a generates the waveform of the reference current value I*.

The set current value data FI fed to reference value control section 11a is stored in set current data storage section 33a. Timing generator circuit 34a generates the generation timing of the reference current value I* based on the period and time data stored in period and time data storage section 31a. Timing generator circuit 34a feeds the generated generation timing of the reference current value I* to signal generator circuit 35a. Signal generator circuit 35a generates, at the generation timing generated by timing generator circuit 34a, the waveform of the reference current value I* based on the current ripple data stored in current ripple data storage section 32a and the set current value data FI stored in set current data storage section 33a. Signal generator circuit 35a feeds the generated waveform of the reference current value I* to drive control circuit 12 shown in FIG. 1.

Figure 8:
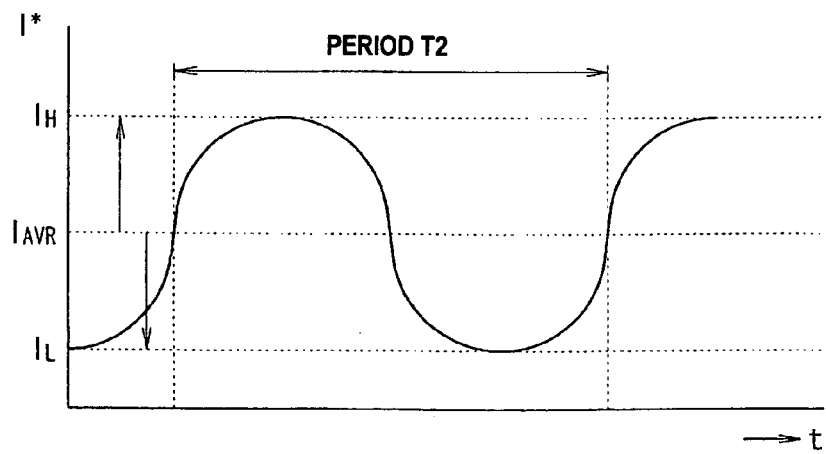
FIG. 8 is a wave chart describing an example of the sinusoidal waveform of the reference current value I* fed to drive control circuit 12 in FIG. 1.
Figure 9:
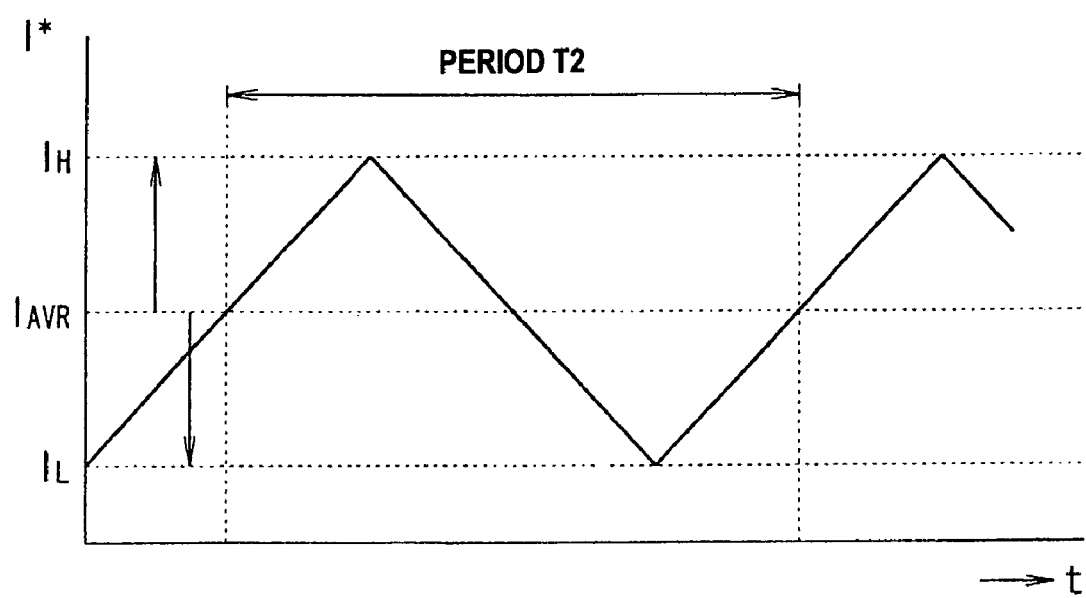
FIG. 9 is a wave chart describing an example of the triangular waveform of the reference current value I* fed to drive control circuit 12 in FIG. 1.

Here, reference value control section 11a in FIG. 1 may generate the reference current value I*, having a sinusoidal waveform as shown in FIG. 8 and the average value $I_{AVR}$ thereof is specified by the set current value data FI. Alternatively, reference value control section 11a may generate the reference current value I*, having a triangular waveform as shown in FIG. 9 and the average value $I_{AVR}$ thereof is specified by the set current value data FI.

Figure 10:
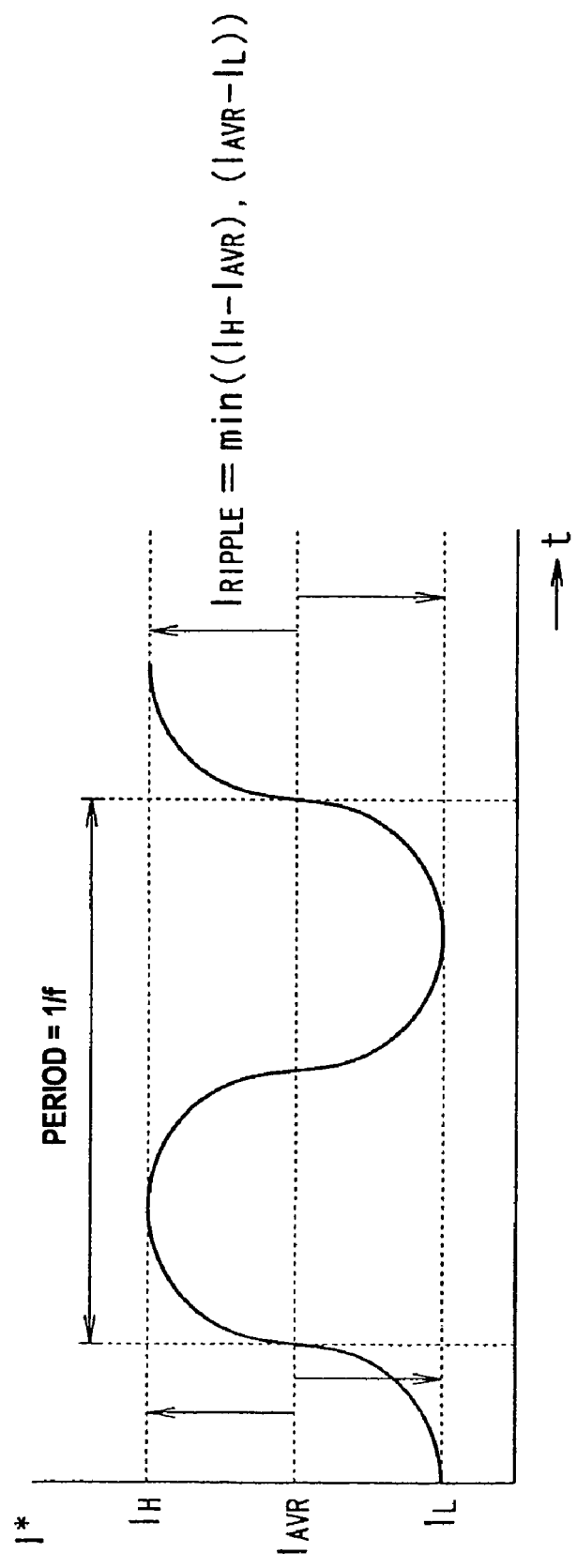
FIG. 10 is a wave chart describing the variables for setting the waveform of the reference current value I* fed to drive control circuit 12 shown in FIG. 1.

As shown in FIG. 10, the sinusoidal waveform Iamp of the reference current value I* is described by the following equation (7) using the average value $I_{AVR}$ of the reference current value I*, the current ripple amplitude $I_{RIPPLE} = \min((I_H - I_{AVR}), (I_{AVR} - I_L))$ and the frequency f.

$$Iamp = I_{RIPPLE} \cdot \sin(2\pi ft) + I_{AVR} \quad (7)$$

The period 1/f is stored in period and time data storage section 31a in FIG. 7. The current ripple amplitude $I_{RIPPLE}$ is stored in current ripple data storage section 32a in FIG. 7. The average value $I_{AVR}$ is stored in set current data storage section 33a in FIG. 7. Signal generator circuit 35a generates the waveform of the reference current value I* based on the equation (7).

Figure 11:
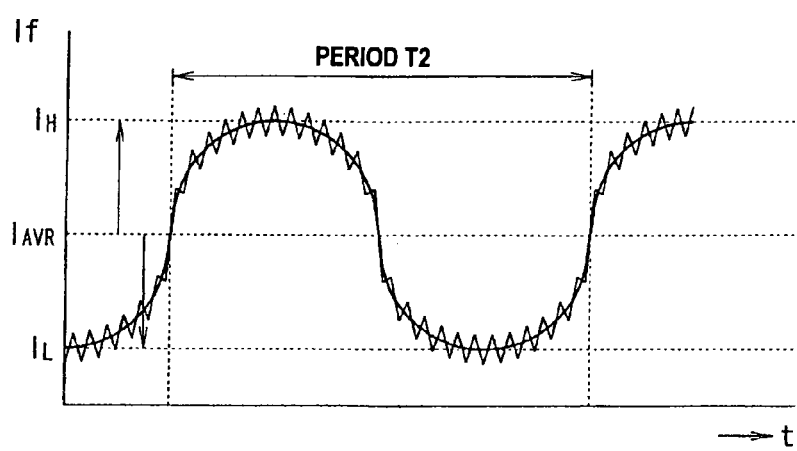
FIG. 11 is a wave chart describing an example of the waveform of current If flowing through inductive load 15 in FIG. 1.

Drive control circuit 12 generates a PWM signal at the period described in FIG. 5 so that current If may follow the reference current value I* having the period T2 described in FIG. 8. By the operation described above, drive control circuit 12 controls the ON and OFF of the switching device in driver circuit 13. As a result, current If as described in FIG. 11 flows through inductive load 15.

Figure 12:
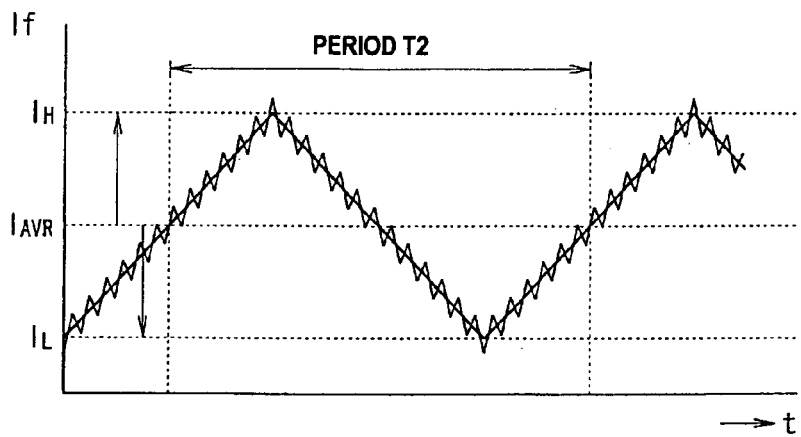
FIG. 12 is a wave chart describing another example of the waveform of current If flowing through inductive load 15 in FIG. 1.

When the waveform described in FIG. 9 is fed for the reference current value I*, drive control circuit 12 generates a PWM signal at the period described in FIG. 5 so that current If may follow the reference current value I* having the period T2 described in FIG. 9. By the operation described above, drive control circuit 12 controls the ON and OFF of the switching device in driver circuit 13. As a result, current If as described in FIG. 12 flow through inductive load 15.

Figure 13:
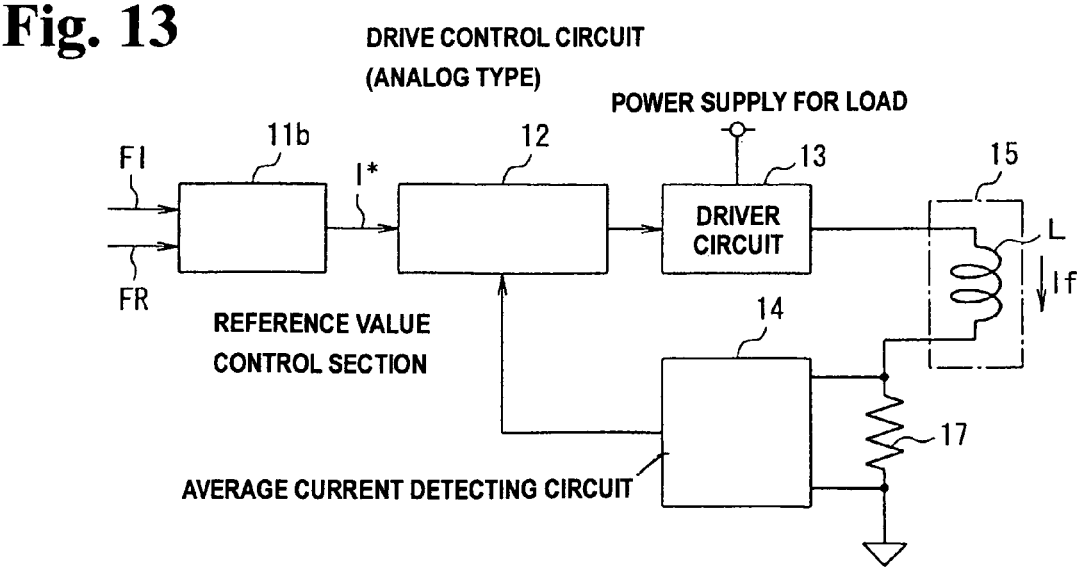
FIG. 13 is a block diagram briefly describing a closed loop control system, to which a drive control apparatus according to a second embodiment of the invention for controlling the drive of an inductive load is applied.

FIG. 13 is a block diagram briefly describing a closed loop control system, to which a drive control apparatus according to a second embodiment of the invention for controlling the drive of an inductive load is applied.

In FIG. 13, reference value control section 11b is disposed according to the second embodiment in substitution for reference value control section 11a in FIG. 1. In FIG. 1, the set current value data FI is fed to reference value control section 11a as a variable. In contrast, the set current value data FI and a current ripple waveform control data FR are fed to reference value control section 11b as variables in FIG. 13. The current ripple waveform control data FR specifies the current ripple amount of the reference current value I*.

Figure 14:
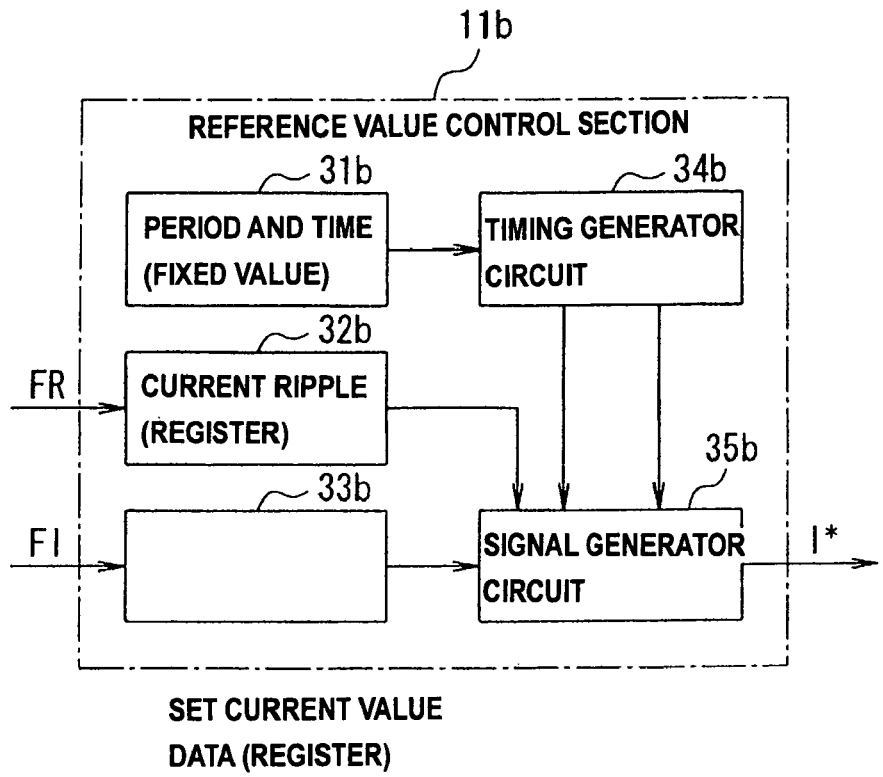
FIG. 14 is a block diagram briefly describing the structure of reference value control section 11b shown in FIG. 13.

FIG. 14 is a block diagram briefly describing the structure of reference value control section 11b shown in FIG. 13.

In FIG. 14, reference value control section 11b includes period and time data storage section 31b, current ripple data storage section 32b, set current data storage section 33b, timing generator circuit 34b, and signal generator circuit 35b. Period and time data storage section 31b stores the period, and time data of the reference current value I* as fixed values. Current ripple data storage section 32b stores the current ripple waveform control data FR of the reference current value I* as a variable. Set current data storage section 33b stores the set current value data FI as a variable. Timing generator circuit 34b generates the generation timing for generating the reference current value I*. Signal generator circuit 35b generates the waveform of the reference current value I*.

As the set current value data FI and the current ripple waveform control data FR are fed to reference value control section 11b, the set current value data FI is stored in set current data storage section 33b and the current ripple waveform control data FR in current ripple data storage section 32b. Signal generator circuit 35b generates, at the generation timing generated by timing generator circuit 34b, the waveform of the reference current value I* based on the current ripple waveform control data FR stored in current ripple data storage section 32b and the set current value data FI stored in set current data storage section 33b. Signal generator circuit 35b feeds the generated waveform of the reference current value I* to drive control circuit 12 shown in FIG. 13.

Figure 15:
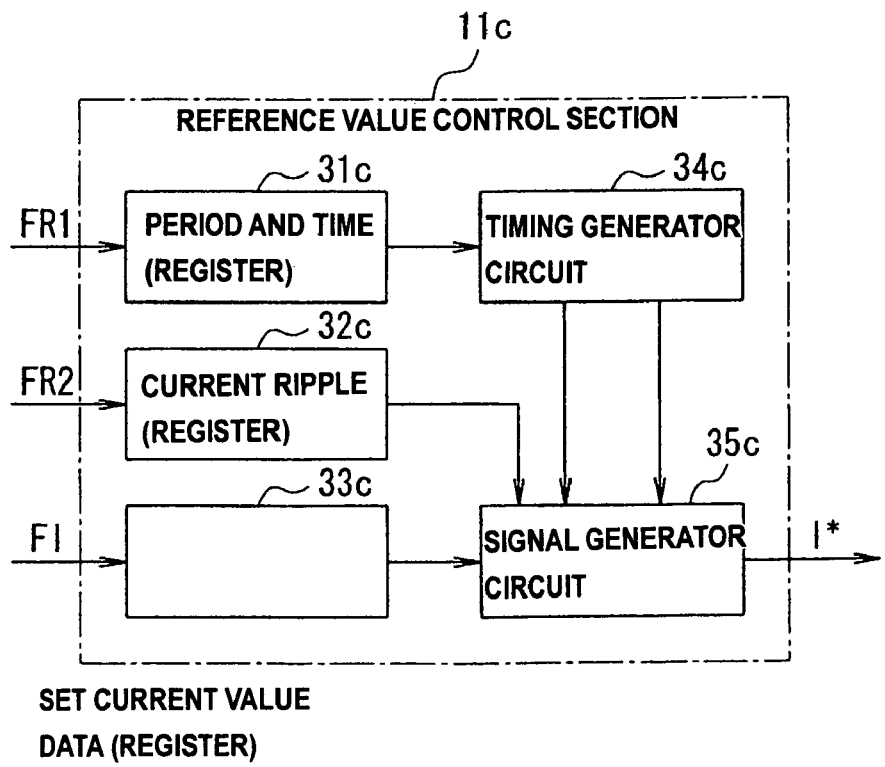
FIG. 15 is a block diagram briefly describing the structure of reference value control section 11c according to a third embodiment of the invention.

FIG. 15 is a block diagram briefly describing the structure of reference value control section 11c according to a third embodiment of the invention.

In FIG. 15, reference value control section 11c according to the third embodiment includes period and time data storage section 31c, current ripple data storage section 32c, set current data storage section 33c, timing generator circuit 34c, and signal generator circuit 35c. Period and time data storage section 31c stores the waveform control data FR1 of the reference current value I* as a variable. Current ripple data storage section 32c stores the current ripple data FR2 of the reference current value I* as a variable. Set current data storage section 33c stores the set current value data FI as a variable. Timing generator circuit 34c generates the generation timing for generating the reference current value I*. Signal generator circuit 35c generates the waveform of the reference current value I*. The waveform control data FR1 specifies the period and time of the reference current value I*. The current ripple data FR2 specifies the current ripple amount of the reference current value I*.

As the waveform control data FR1, the current ripple data FR2, and the set current value data FI are fed to reference value control section 11c, the set current value data FI is stored in set current data storage section 33c, the current ripple data FR2 in current ripple data storage section 32c and the waveform control data FR1 in period and time data storage section 31c. Signal generator circuit 35c generates, at the generation timing generated by timing generator circuit 34c, the waveform of the reference current value I* based on the current ripple data FR2 stored in current ripple data storage section 32c, the set current value data FI stored in set current data storage section 33c, and the waveform control data FR1 stored in period and time data storage section 31c.

Figures 16, 17, 18:
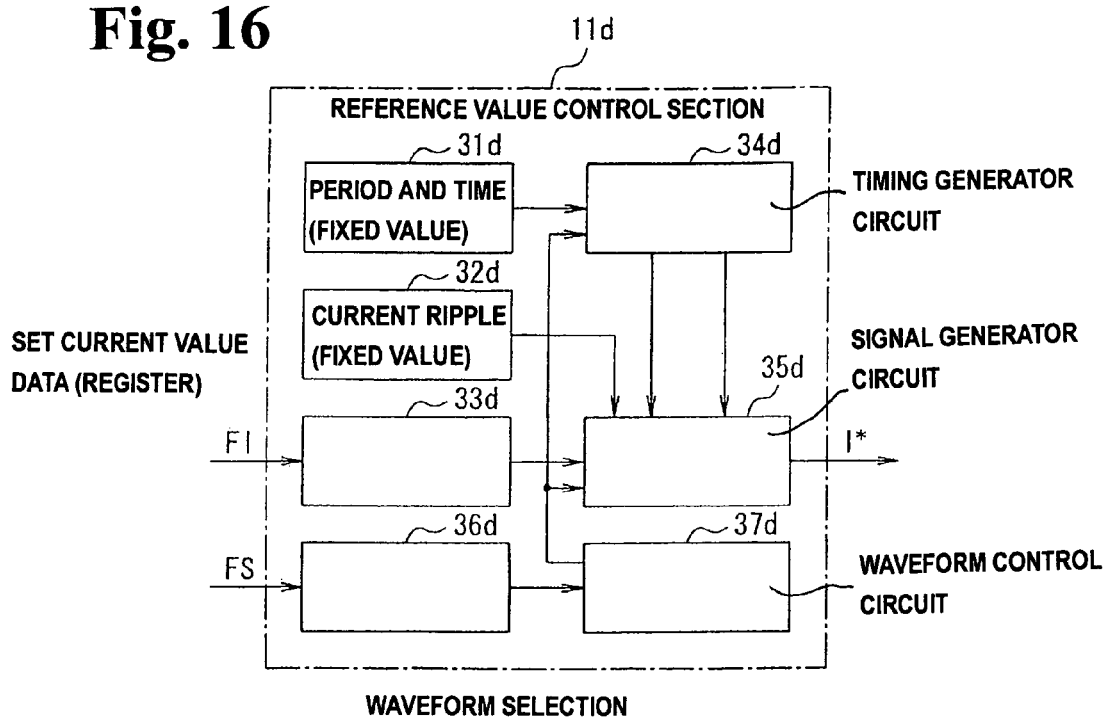
FIG. 16 is a block diagram briefly describing the structure of reference value control section 11d according to a fourth embodiment of the invention.
FIG. 17 shows an example of the period and time data according to any of the embodiments of the invention.
FIG. 18 shows an example of the current ripple data according to any of the embodiments of the invention.

FIG. 16 is a block diagram briefly describing the structure of reference value control section 11d according to a fourth embodiment of the invention.

In FIG. 16, reference value control section 11d according to the fourth embodiment includes period and time data storage section 31d, current ripple data storage section 32d, set current data storage section 33d, timing generator circuit 34d, signal generator circuit 35d, waveform selection data storage section 36d, and waveform control circuit 37d. Period and time data storage section 31d stores the period and time data of the reference current value I* as fixed values. Current ripple data storage section 32d stores the current ripple data of the reference current value I* as a fixed value. Set current data storage section 33d stores the set current value data FI as a variable. Timing generator circuit 34d generates the generation timing for generating the reference current value I*. Signal generator circuit 35d generates the waveform of the reference current value I*. Waveform selection data storage section 36d stores a waveform selection data FS as a variable. Waveform control circuit 37d controls the waveform of the reference current value I*.

Waveform control circuit 37d stores a control data for controlling the waveform (a triangular wave, a sinusoidal wave, a saw-tooth wave, etc.) of the reference current value I*. Waveform control circuit 37d incorporates therein calculation steps for generating a triangular wave, a sinusoidal wave, a saw-tooth wave, etc. The waveform selection data FS is a selection signal for selecting the waveform control data of the reference current value I* stored in waveform control circuit 37d. For example, the selection signal is set at 0 when the reference current value I* is a triangular wave, at 1 when the reference current value I* is a sinusoidal wave, at 2 when the reference current value I* is a saw-tooth wave, and so on.

As the set current value data FI and the waveform selection data FS are fed to reference value control section 11d, the set current value data FI is stored in set current data storage section 33d, and the waveform selection data FS in waveform selection data storage section 36d. Timing generator circuit 34d generates the generation timing of the reference current value I* based on the period and time data stored in period and time data storage section 31d and the waveform selection data FS stored in waveform selection data storage section 36d. Timing generator circuit 34d feeds the generation timing of the reference current value I* to signal generator circuit 35d. Signal generator circuit 35d generates, in accordance with the generation timing generated by timing generator circuit 34d and the waveform selection data FS stored in waveform selection data storage section 36d, the waveform of the reference current value I* based on the current ripple data stored in current ripple data storage section 32d and the set current value data FI stored in the set current data storage section 33d.

Reference value control section 11d according to the fourth embodiment shown in FIG. 16 has been described so far in connection with the period and time data and the current ripple amount treated as fixed values. Alternatively, the current ripple amount may be fed from the outside as described in FIG. 14 with no problem. Still alternatively, the period and time data and the current ripple amount may be fed from the outside as described in FIG. 15 with no problem.

FIG. 17 shows an example of the period and time data according to any of the embodiments of the invention.

In FIG. 17, the period and time data includes a period set at 2 ms and a frequency set at 500 Hz.

FIG. 18 shows an example of the current ripple data according to any of the embodiments of the invention.

In FIG. 18, the current ripple data includes a current ripple amplitude $I_{RIPPLE}$ set at 50 mA.

Figure 19:
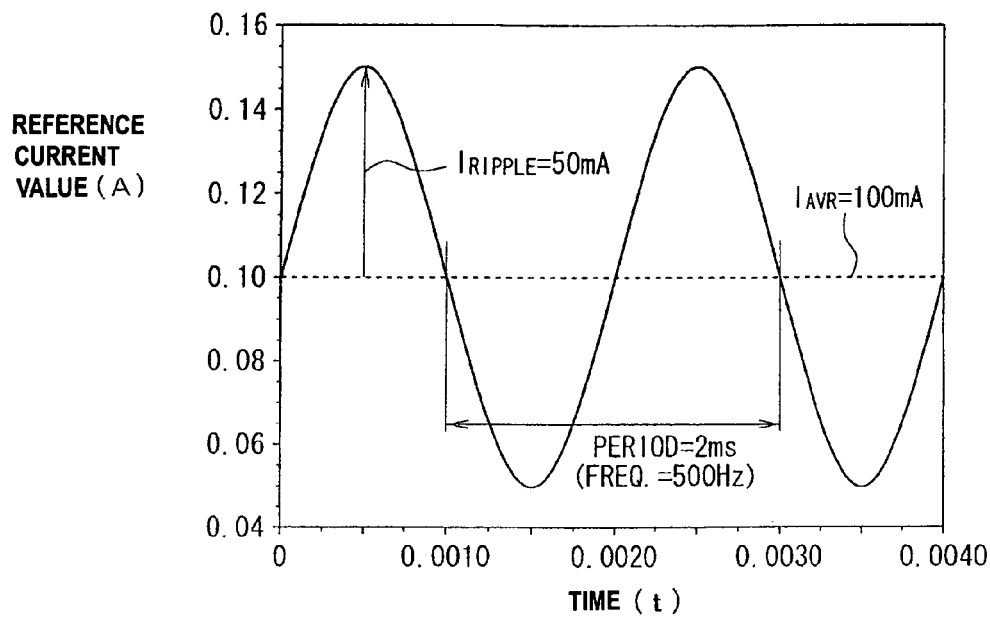
FIG. 19 is a wave chart describing the waveform of the reference current value I* fed to drive control circuit 12 shown in FIG. 1, wherein the frequency thereof (corresponding to the current ripple frequency f2 in FIG. 6) is set at 500 Hz.

FIG. 19 is a wave chart describing the waveform of the reference current value I* fed to drive control circuit 12 shown in FIG. 1, wherein the frequency thereof (corresponding to the current ripple frequency f2 in FIG. 6) is set at 500 Hz.

In FIG. 19, when the set current value data FI is set at 100 mA, the period and time data is set as described in FIG. 17 and the current ripple data is set as described in FIG. 18, a reference current value I* having the frequency of 500 Hz, the current ripple amount $(I_H-I_L)$ of 100 mA and the average value $I_{AVR}$ of 100 mA is obtained.

Figure 20:
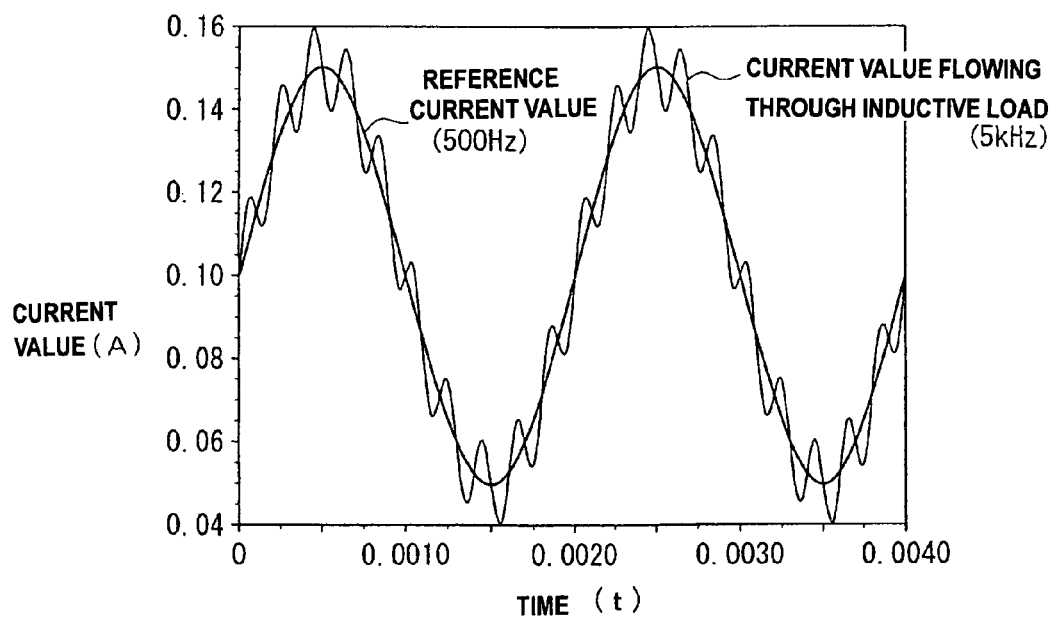
FIG. 20 is a wave chart describing the waveform of the reference current value I* fed to drive control circuit 12 shown in FIG. 1, wherein the frequency thereof (corresponding to the current ripple frequency f2 in FIG. 6) is set at 500 Hz and the switching frequency of switching device SW in the equivalent circuit described in FIG. 3 (corresponding to the current ripple frequency f1 in FIG. 6) is set at 5 kHz.

FIG. 20 is a wave chart describing the waveform of the reference current value I*, fed to drive control circuit 12 shown in FIG. 1. The frequency (corresponding to the current ripple frequency f2 in FIG. 6) is set at 500 Hz and the switching frequency of switching device SW in the equivalent circuit described in FIG. 3 (corresponding to the current ripple frequency f1 in FIG. 6) is set at 5 kHz.

If the reference current value I* is provided with the waveform described in FIG. 19, current If having a current ripple waveform of 500 Hz, onto which a current ripple waveform of 5 kHz is superposed, may be made to flow through inductive load 15.

As described in FIG. 5, the current ripple amount $(I_H-I_L)$ can be made to be small by shortening the period T1 of the PWM signal, and the maximum current value fed to the A/D converter used in average current detecting circuit 14 can be made to be small. Therefore, the bit number of the A/D converter can be reduced.

Figure 21:
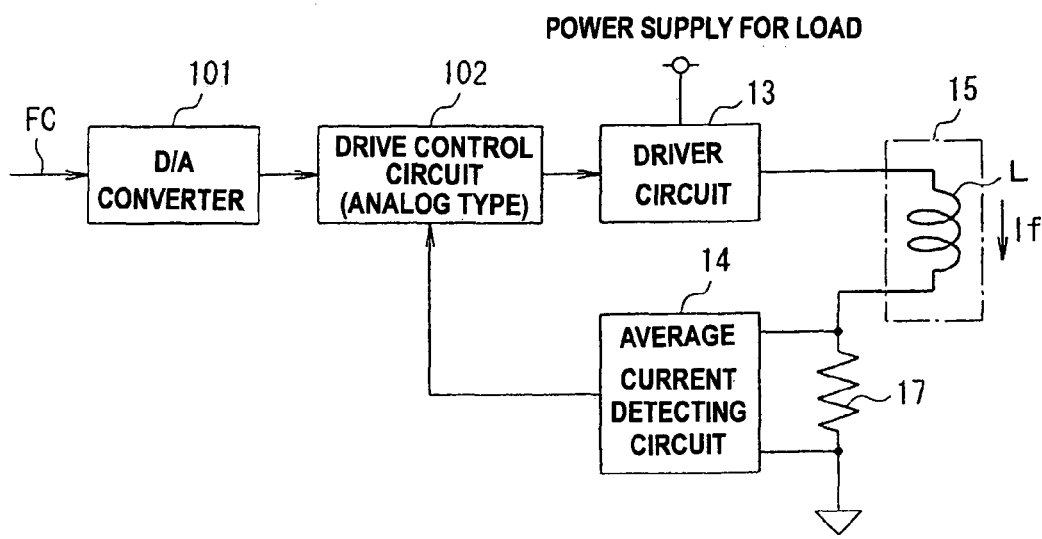
FIG. 21 is a block diagram briefly describing a closed loop control system, to which a conventional drive control apparatus for controlling the drive of an inductive load is applied.
Figure 22:
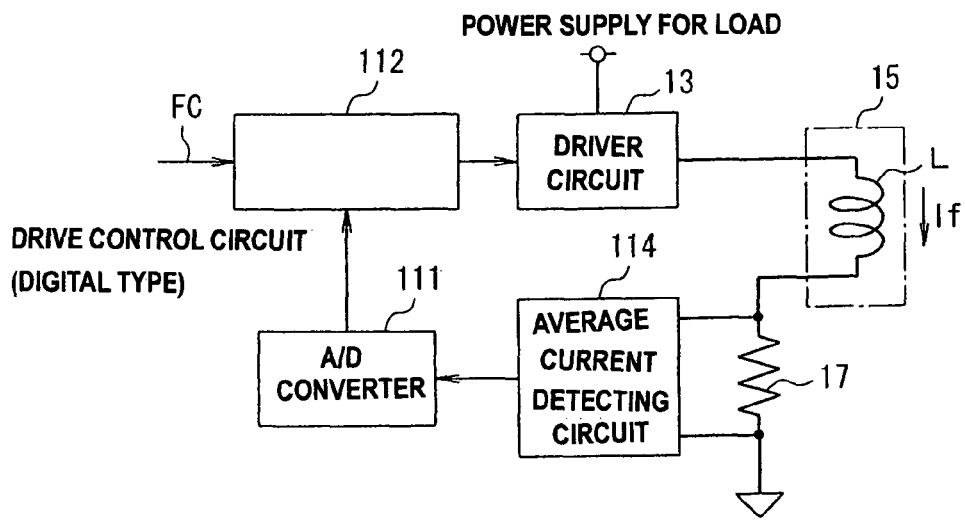
FIG. 22 is a block diagram briefly describing another closed loop control system, to which a conventional drive control apparatus for controlling the drive of an inductive load is applied.
Figure 23:
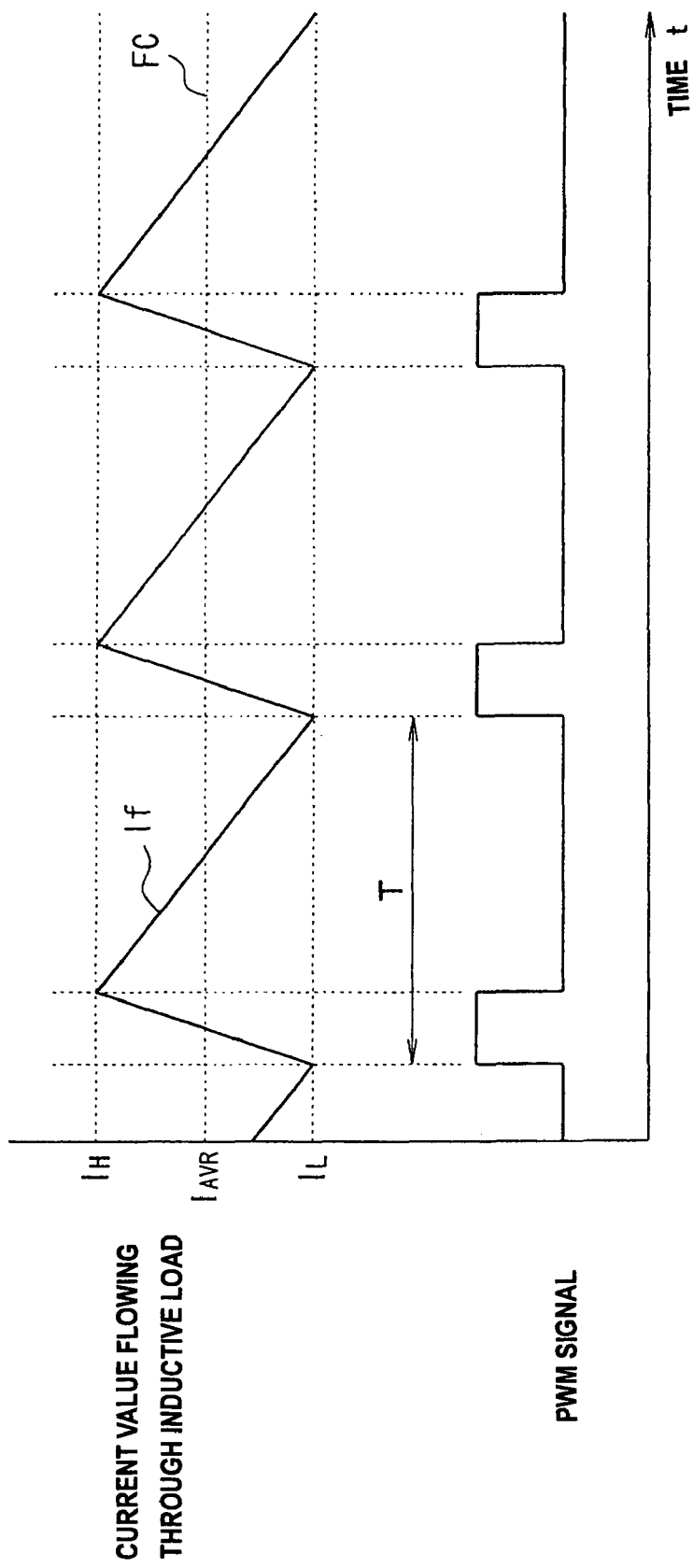
FIG. 23 is a timing chart describing the waveform of current If flowing through an inductive load by the PWM control conducted by the conventional drive control apparatus.
Figure 24:
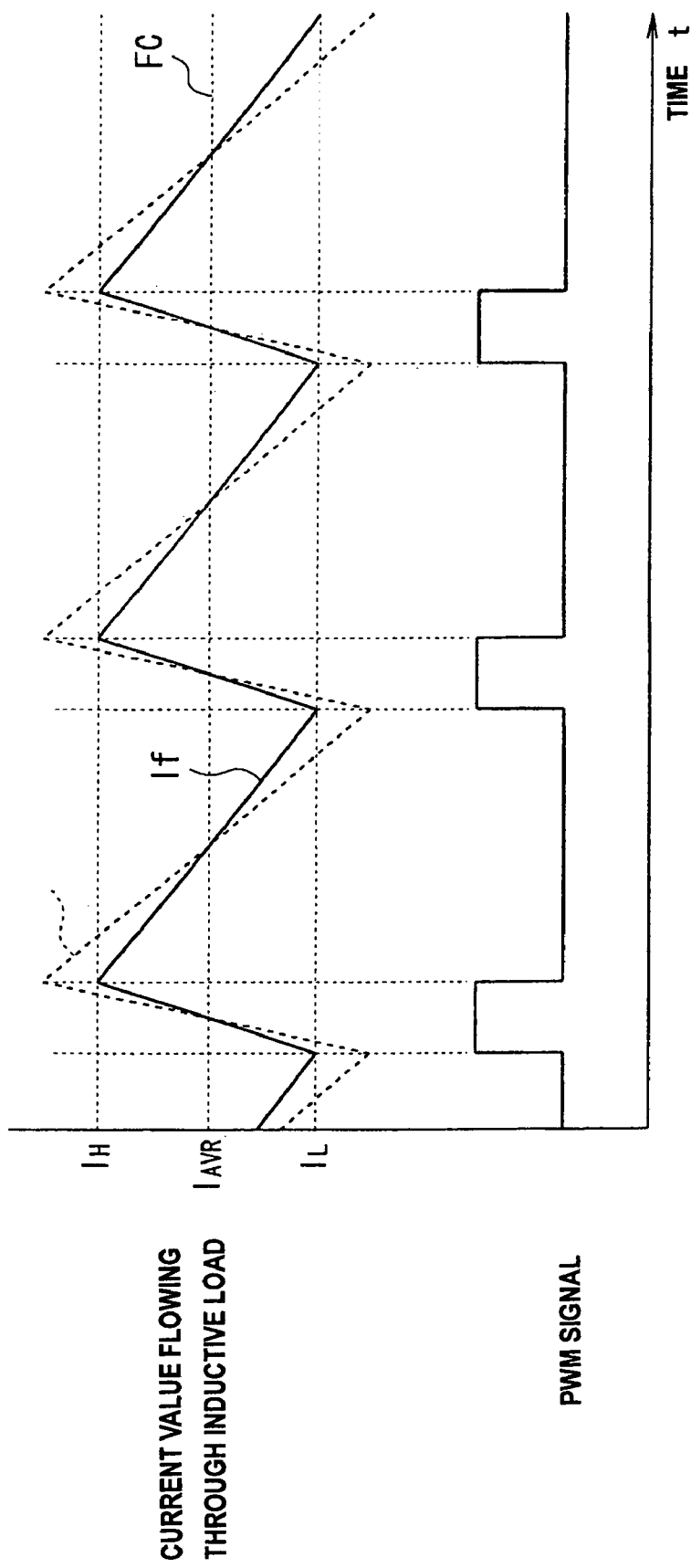
FIG. 24 is a timing chart describing the waveforms of currents If flowing through inductive loads and having different characteristics by the PWM control conducted by the conventional drive control apparatus.
Figure 25:
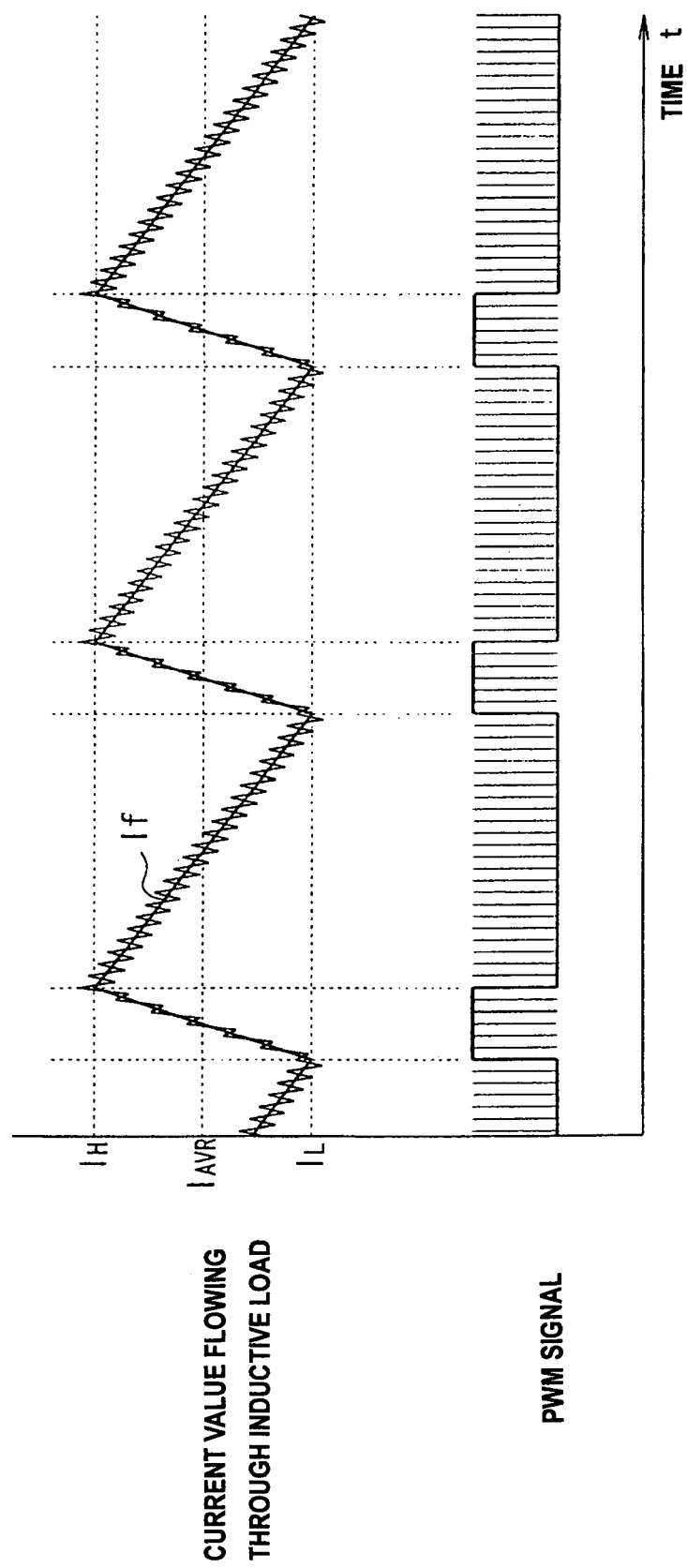
FIG. 25 is a timing chart describing the waveform of current If flowing through inductive load 15 and controlled with a PWM signal having a dither signal by the conventional drive control apparatus.
Figure 1:
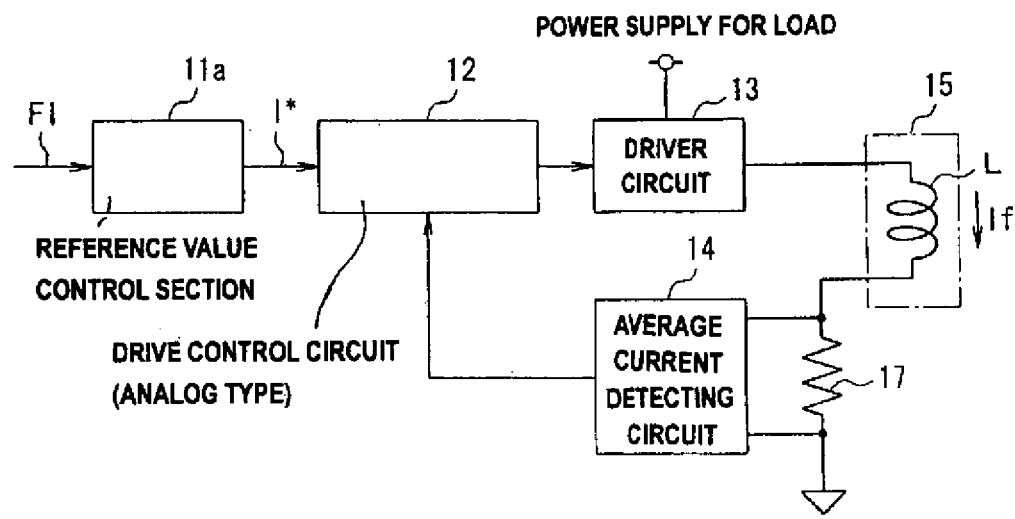
Figure 2:
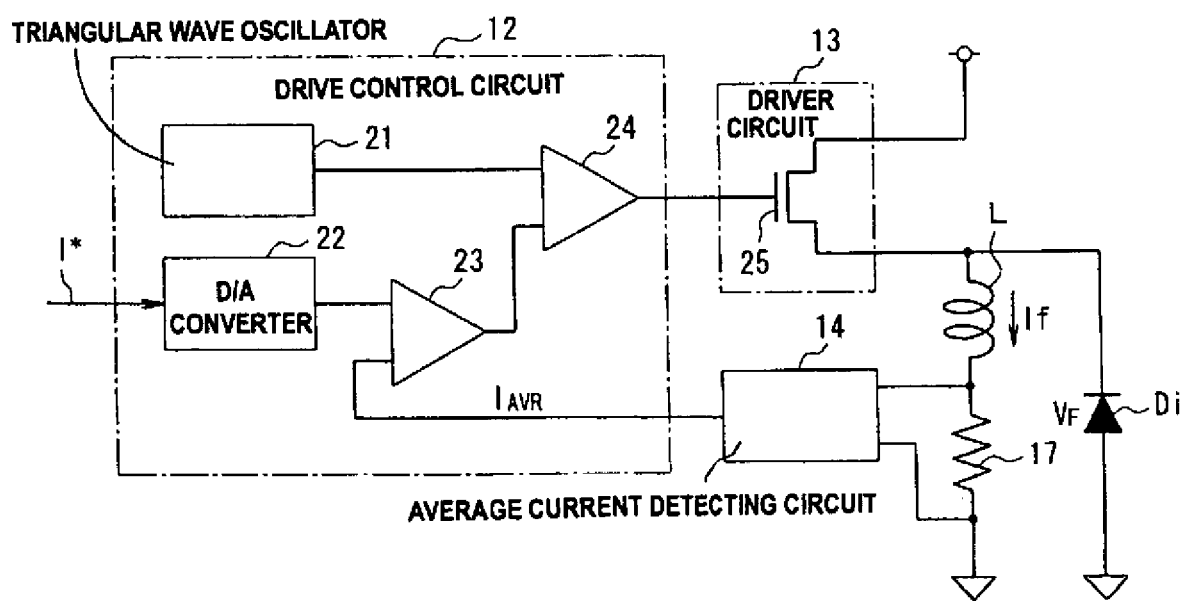
Figure 6:
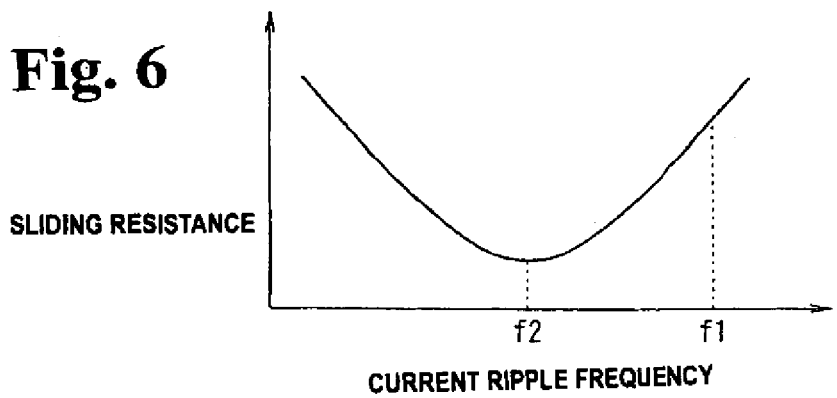
Figure 7:
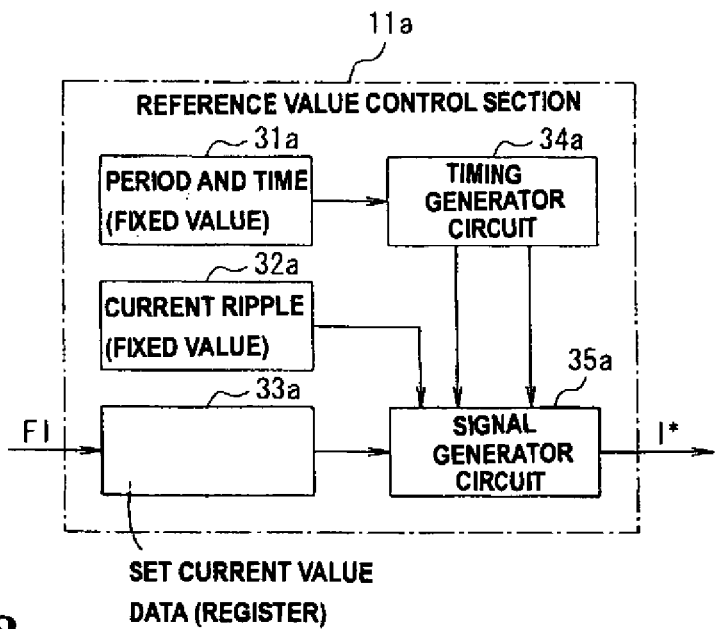
Figure 8:
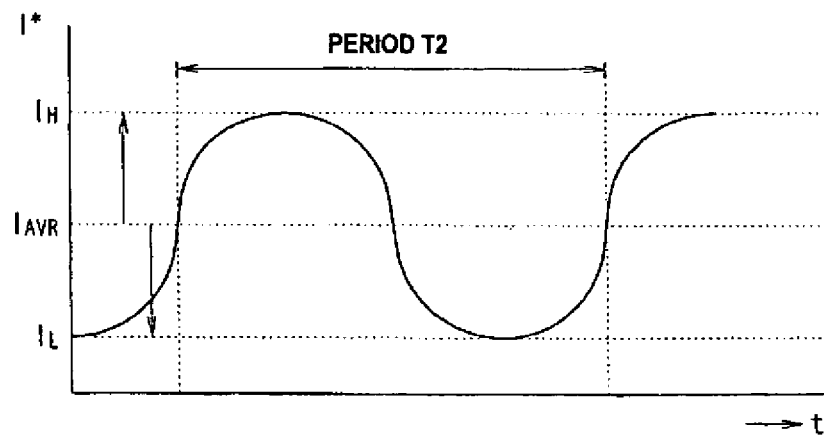
Figure 11:
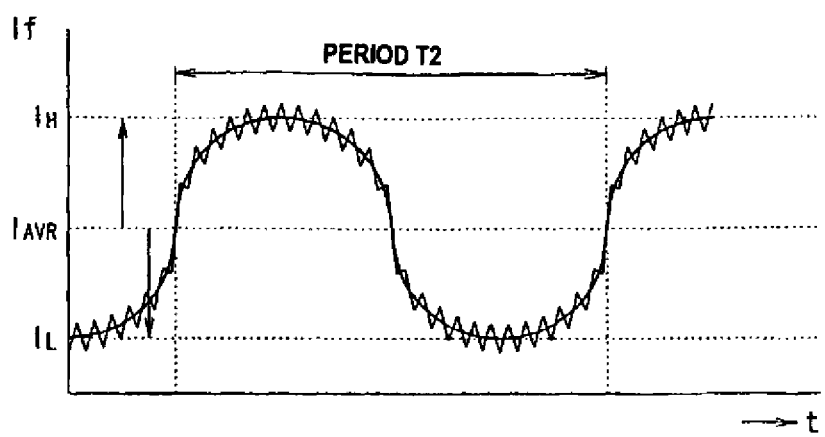
Figure 12:
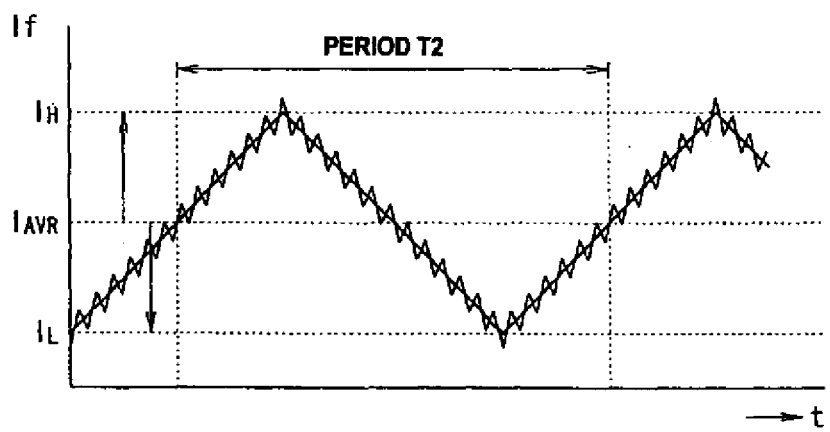
Figure 13:
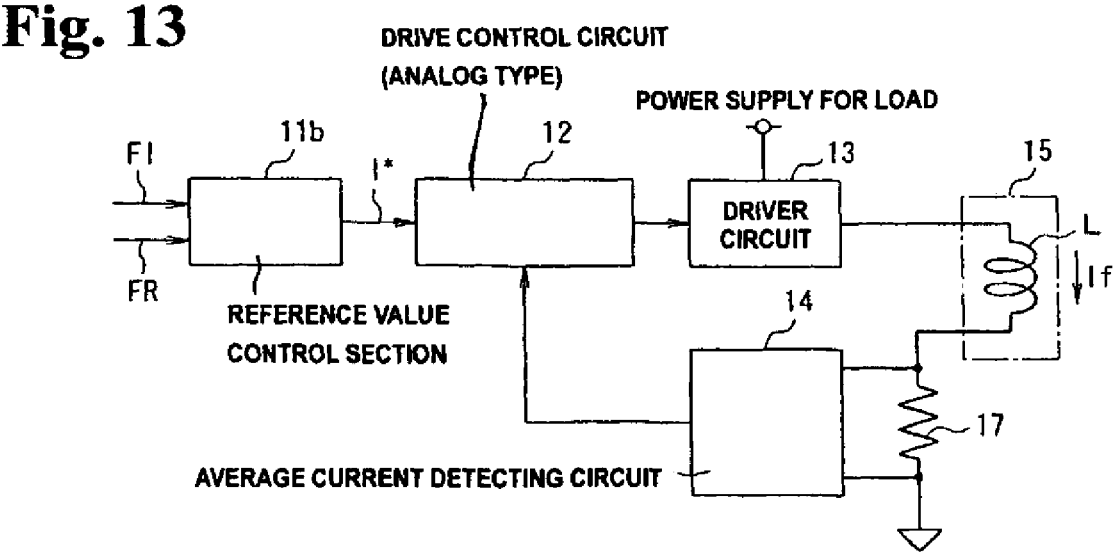
Figure 14:
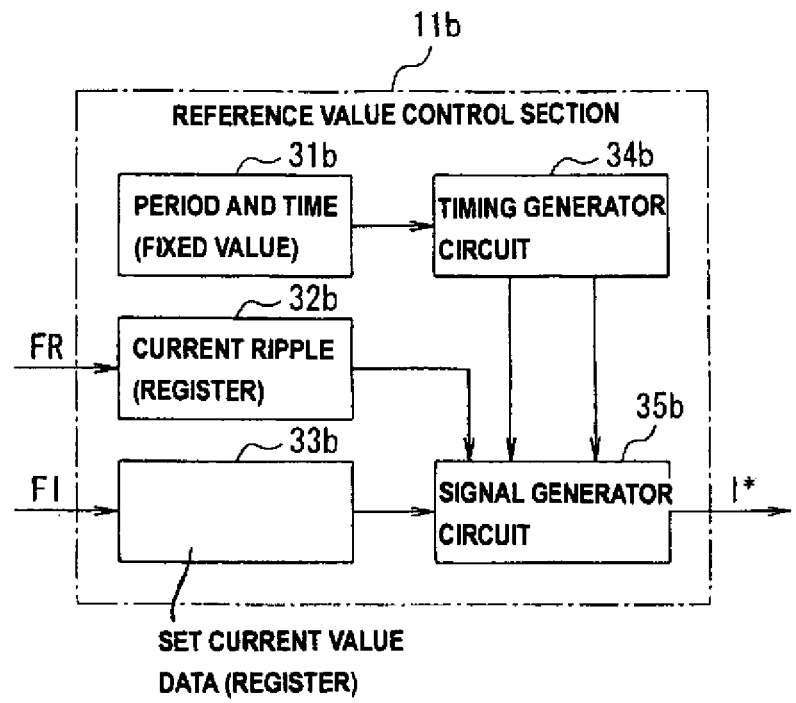
Figure 15:
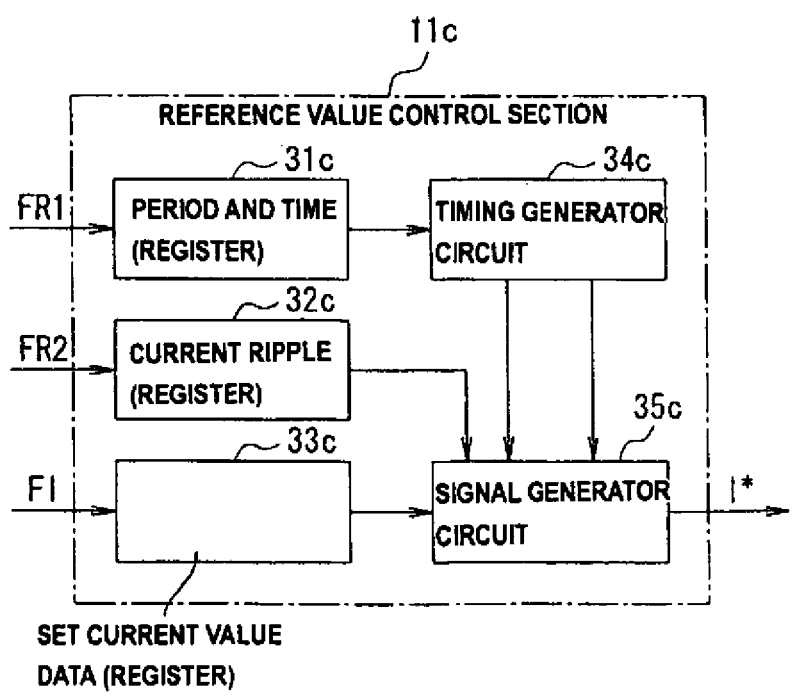
Figures 16, 17, 18:
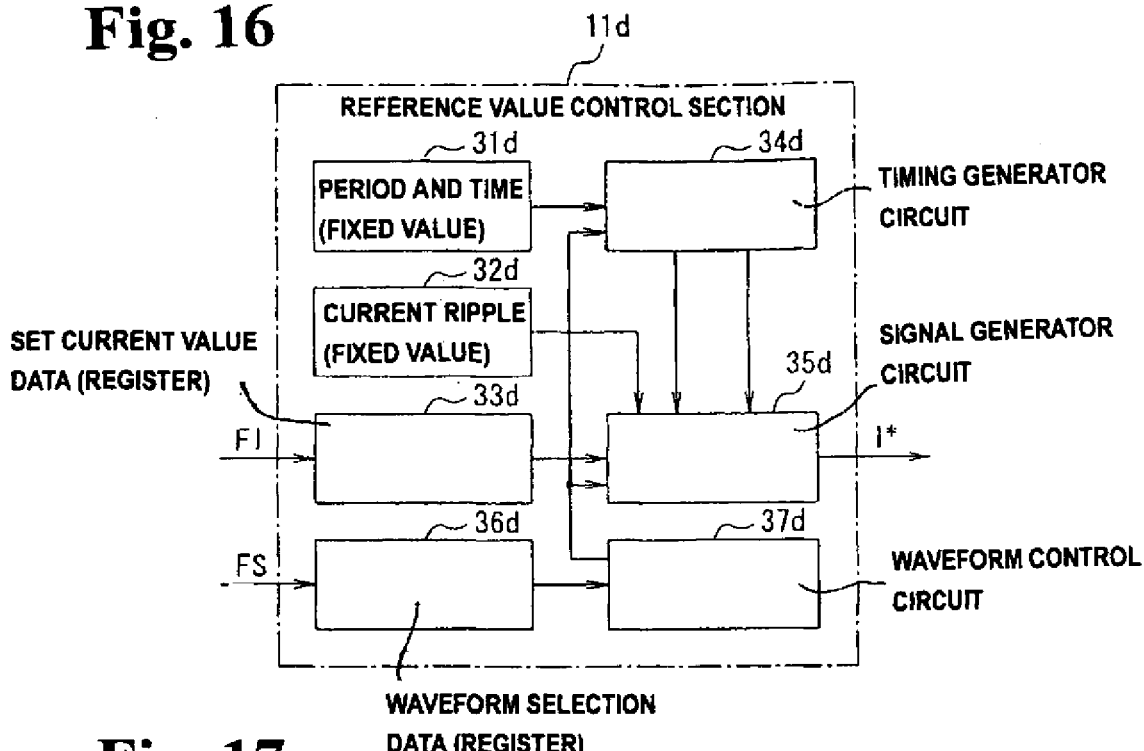
Figure 21:
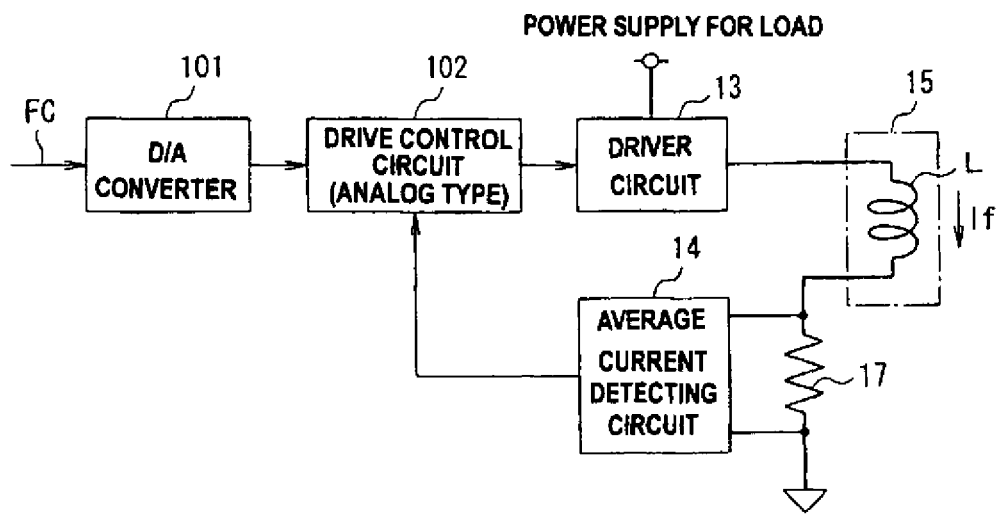
Figure 22:
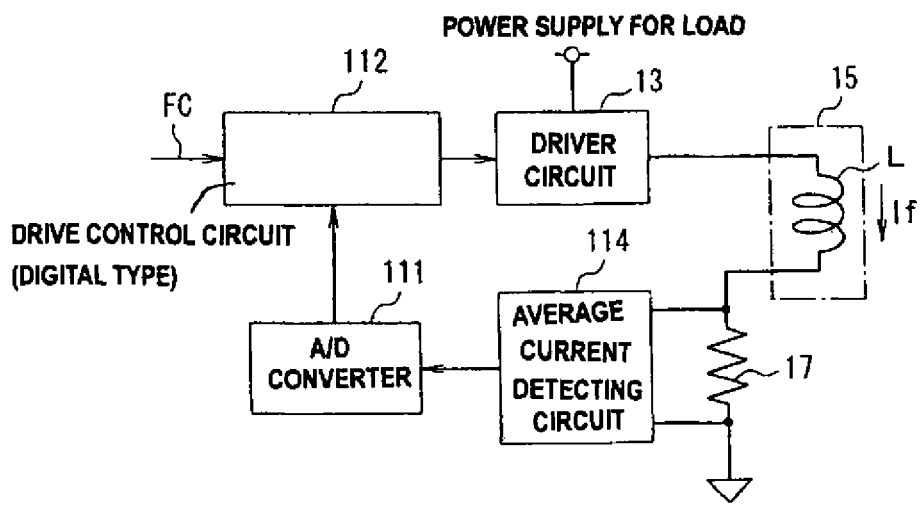
Figure 24:
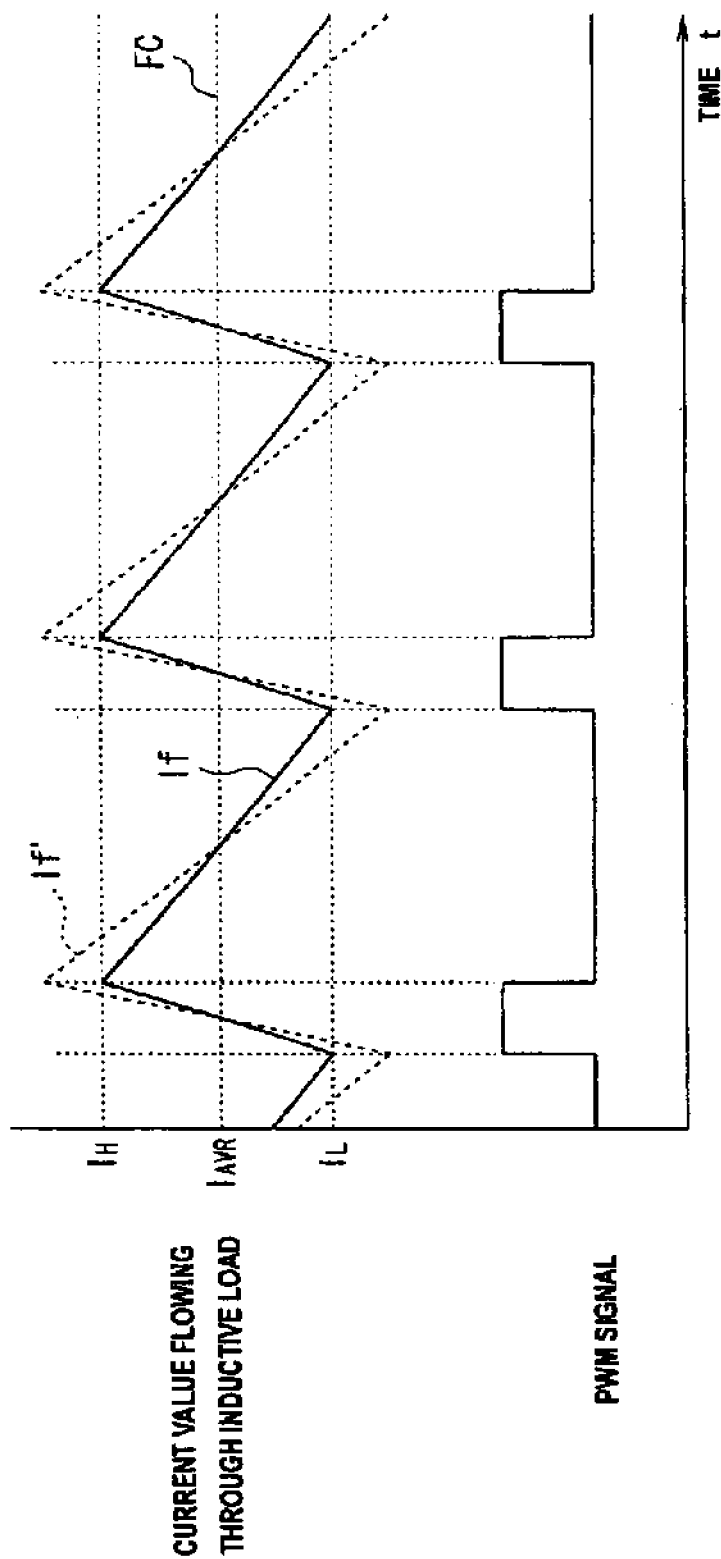

For example, if the set current value data FI is set at 900 mA and the current ripple amount $I_{RIPPLE}$ at 100 mA, when 1 least significant bit (LSB) corresponds to 1 mA, then, the maximum current value flowing through inductive load 15 in FIG. 21 will be 1100 mA (an 11 bits data (10001001100) in the binary number). In contrast, the maximum current value flowing through inductive load 15 in FIG. 1 will be 1020 mA (a 10 bits data (1111111100) in the binary number). Therefore, it is necessary for the A/D converter shown in FIG. 21 to exhibit a bit capacity of 11 bits. In contrast, it is sufficient for the A/D converter shown in FIG. 1 to exhibit a bit capacity of 10 bits.

The structure according to any of the embodiments of the invention makes current If flowing through inductive load 15 follow the reference current value I* and controls the current variation width due to the PWM control within a certain range. Therefore, the structure according to any of the embodiments of the invention can utilize the window AD system (disclosed in US 2006/0055574 A1) and make the circuit scale of the A/D converter small.

The disclosure of Japanese Patent Application No. 2008-013857 filed on Jan. 24, 2008 is incorporated as a reference.

While the invention has been explained with reference to the specific embodiments of the invention, the explanation is illustrative and the invention is limited only by the appended claims.

What is claimed is:

1. A drive control apparatus for controlling a drive of an inductive load having a current flowing therethrough, comprising:
   a drive control device for controlling a variation of the current flowing through the inductive load within a certain period by Pulse Width Modulation control so as to become approximately equal to a reference current value; and
   a reference value control device for controlling a fluctuation period of the reference current value and making the fluctuation period of the reference current value longer than that of the current flowing through the inductive load by the Pulse Width Modulation control.

2. The drive control apparatus according to claim 1, wherein the drive control device sets a pulse width by the Pulse Width Modulation control based on a difference between an average value of the current flowing through the inductive load and the reference current value.

3. The drive control apparatus according to claim 1, wherein the inductive load is a linear solenoid with a sliding resistance, and the fluctuation period of the reference current value is set such that the sliding resistance of the linear solenoid is minimized, and
   wherein the fluctuation period by the Pulse Width Modulation control is set such that a current ripple amount of the current flowing through the inductive load falls within a detectable current range.

4. The drive control apparatus according to claim 1, further comprising an amplitude setting device for setting an amplitude of the reference current value.

5. The drive control apparatus according to claim 1, further comprising a period setting device for setting a period of the reference current value.

6. The drive control apparatus according to claim 1, further comprising a waveform setting device for setting a waveform of the reference current value.

7. The drive control apparatus according to claim 1, further comprising an average current detecting device for detecting an average value of the current flowing through the inductive load by a digital processing, said average current detecting device including an A/D converter having a bit number set corresponding to an amplitude of the reference current value.

8. A drive control method for controlling a drive of an inductive load, comprising the steps of:
   making a variation of a current flowing through the inductive load within a certain period by Pulse Width Modulation control become approximately equal to a reference current value; and
   controlling a fluctuation period of the reference current value longer than a fluctuation period of the current flowing through the inductive load by the Pulse Width Modulation control.

* * * * *

UNITED STATES PATENT AND TRADEMARK OFFICE
CERTIFICATE OF CORRECTION

| | | |
|---|---|---|
| PATENT NO. | : 7,795,930 B2 | Page 1 of 9 |
| APPLICATION NO. | : 12/320162 | |
| DATED | : September 14, 2010 | |
| INVENTOR(S) | : Masashi Akahane et al. | |

It is certified that error appears in the above-identified patent and that said Letters Patent is hereby corrected as shown below:

The title page showing the illustrative figure should be deleted to be replaced with the attached title page.

The drawing sheet, consisting of Figs. 1, 2, 7, 13, 14, 15, 16, 22, and 24, should be deleted to be replaced with the drawing sheets, consisting of Figs. 1, 2, 7, 13, 14, 15, 16, 22, and 24, as shown on the attached pages.

Signed and Sealed this
Fifteenth Day of March, 2011

David J. Kappos
*Director of the United States Patent and Trademark Office*

(12) United States Patent
Akahane et al.

(10) Patent No.: US 7,795,930 B2
(45) Date of Patent: Sep. 14, 2010

(54) DRIVE CONTROL APPARATUS FOR CONTROLLING DRIVE OF INDUCTIVE LOAD AND DRIVE CONTROL METHOD FOR CONTROLLING THE SAME

(75) Inventors: Masashi Akahane, Matsumoto (JP); Motomitsu Iwamoto, Matsumoto (JP); Haruhiko Nishio, Matsumoto (JP); Minoru Nishio, Matsumoto (JP); Hiroshi Tobisaka, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 75 days.

(21) Appl. No.: 12/320,162

(22) Filed: Jan. 21, 2009

(65) Prior Publication Data
US 2009/0189580 A1 Jul. 30, 2009

(30) Foreign Application Priority Data
Jan. 24, 2008 (JP) ............................ 2008-013857

(51) Int. Cl.
*H03K 3/00* (2006.01)
(52) U.S. Cl. .................. 327/110; 327/423; 327/588
(58) Field of Classification Search ................. 327/110, 327/423, 588
See application file for complete search history.

(56) References Cited

U.S. PATENT DOCUMENTS 6,256,163 B1 * 7/2001 Schmidt et al. .......... 360/78.09
6,943,514 B1 * 9/2005 Chen et al. ............. 318/400.29

FOREIGN PATENT DOCUMENTS

| JP | H08-277956 A | 10/1996 |
|---|---|---|
| JP | H11-159652 A | 6/1999 |
| JP | 2007-40361 A | 2/2007 |

* cited by examiner

Primary Examiner —Kenneth B. Wells
(74) *Attorney, Agent, or Firm* —Manabu Kanesaka

(57) ABSTRACT

A drive control apparatus controls a drive of an inductive load having a current flowing therethrough. The drive control apparatus includes a drive control device for controlling a variation of the current flowing through the inductive load within a certain period by Pulse Width Modulation control so as to come close to a reference current value, and a reference value control device for controlling a fluctuation period of the reference current value and making the fluctuation period of the reference current value longer than that of the current flowing through the inductive load by the Pulse Width Modulation control.

8 Claims, 15 Drawing Sheets

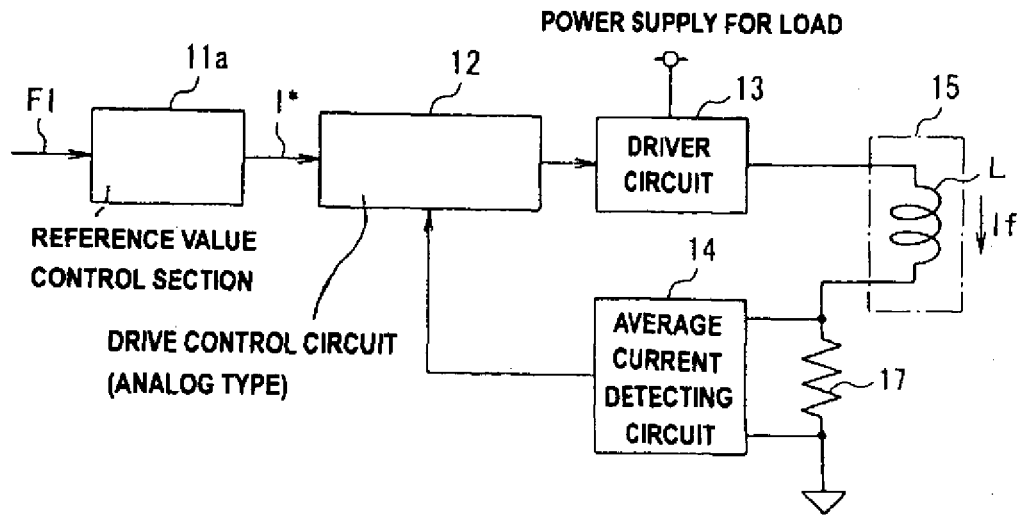

PERIOD=2ms
FREQUENCY=500Hz

IRIPPLE=50mA